United States Patent
Tsukamoto et al.

[11] Patent Number: 6,115,136
[45] Date of Patent: Sep. 5, 2000

[54] TWO-DIMENSIONAL POSITION/ORIENTATION MEASURING MARK, TWO-DIMENSIONAL POSITION/ORIENTATION MEASURING METHOD AND APPARATUS, CONTROL APPARATUS FOR IMAGE RECORDING APPARATUS, AND CONTROL APPARATUS FOR MANIPULATOR

[75] Inventors: Kazuyuki Tsukamoto; Ryuzo Okada, both of Ashigarakami-gun, Japan

[73] Assignee: Fuji Xerox Co., Ltd., Tokyo, Japan

[21] Appl. No.: 09/167,724

[22] Filed: Oct. 7, 1998

Related U.S. Application Data

[62] Division of application No. 08/692,260, Aug. 5, 1996, Pat. No. 5,901,273.

[30] Foreign Application Priority Data

Oct. 17, 1995 [JP] Japan ................................ 7-268902

[51] Int. Cl.[7] ................................................ G06K 15/00
[52] U.S. Cl. .................................... 358/1.18; 358/1.12
[58] Field of Search ........................... 358/1.1, 1.2, 1.16, 358/1.18, 1.12; 356/400, 363; 901/47; 702/150; 382/171, 173, 175, 177, 178, 180, 209; 345/419, 427, 442

[56] References Cited

U.S. PATENT DOCUMENTS

| | | |
|---|---|---|
| 4,488,173 | 12/1984 | Di Matteo et al. . |
| 4,630,225 | 12/1986 | Hisano . |
| 4,662,752 | 5/1987 | Tucker et al. . |
| 4,672,564 | 6/1987 | Egli et al. . |
| 4,688,182 | 8/1987 | Schrieber ................................ 364/523 |
| 4,791,482 | 12/1988 | Barry et al. . |
| 4,843,287 | 6/1989 | Toft . |
| 4,933,864 | 6/1990 | Evans, Jr. et al. . |
| 5,076,690 | 12/1991 | Devos et al. . |
| 5,268,998 | 12/1993 | Simpson ................................ 395/127 |
| 5,274,575 | 12/1993 | Abe . |
| 5,621,807 | 4/1997 | Eibert et al. . |

FOREIGN PATENT DOCUMENTS

| | | |
|---|---|---|
| 64-18001 | 1/1989 | Japan . |
| 3-17503 | 1/1991 | Japan . |
| 6-118735 | 4/1994 | Japan . |

*Primary Examiner*—Arthur G. Evans
*Attorney, Agent, or Firm*—Oliff & Berridge, PLC

[57] ABSTRACT

A mark is provided on an object surface of an object under measurement, and the mark provides two intersection points $P_1$ and $P_2$ between first and second straight lines $L_1$, $L_2$, and between second and third lines $L_2$, $L_3$, in which an angle "$\alpha$" defined by the first and second straight lines $L_1$ and $L_2$, another angle "$\beta$" defined by the second and third straight lines $L_2$ and $L_3$, and a distance between $P_1$ and $P_2$ are known. This mark is imaged on at least one set of one-dimensional optical sensor. When a sensor signal having a light intensity distribution along a longitudinal direction is outputted from the one-directional optical sensor, a calculation unit calculates positions of the straight lines $L_1$ to $L_3$ of the mark image on the one-dimensional optical sensor in response to the sensor signal. Based upon this calculation result, another calculation is made of at least one position of the two intersection points $P_1$ and $P_2$, and also an inclination of at least one straight line among the straight lines $L_1$ to $L_3$. For instance, this calculation result is used as a reference point for measuring the position of the object under measurement, and also a reference line for measuring the orientation thereof.

3 Claims, 15 Drawing Sheets

TRANSPORT DIRECTION OF DETECTION LINE

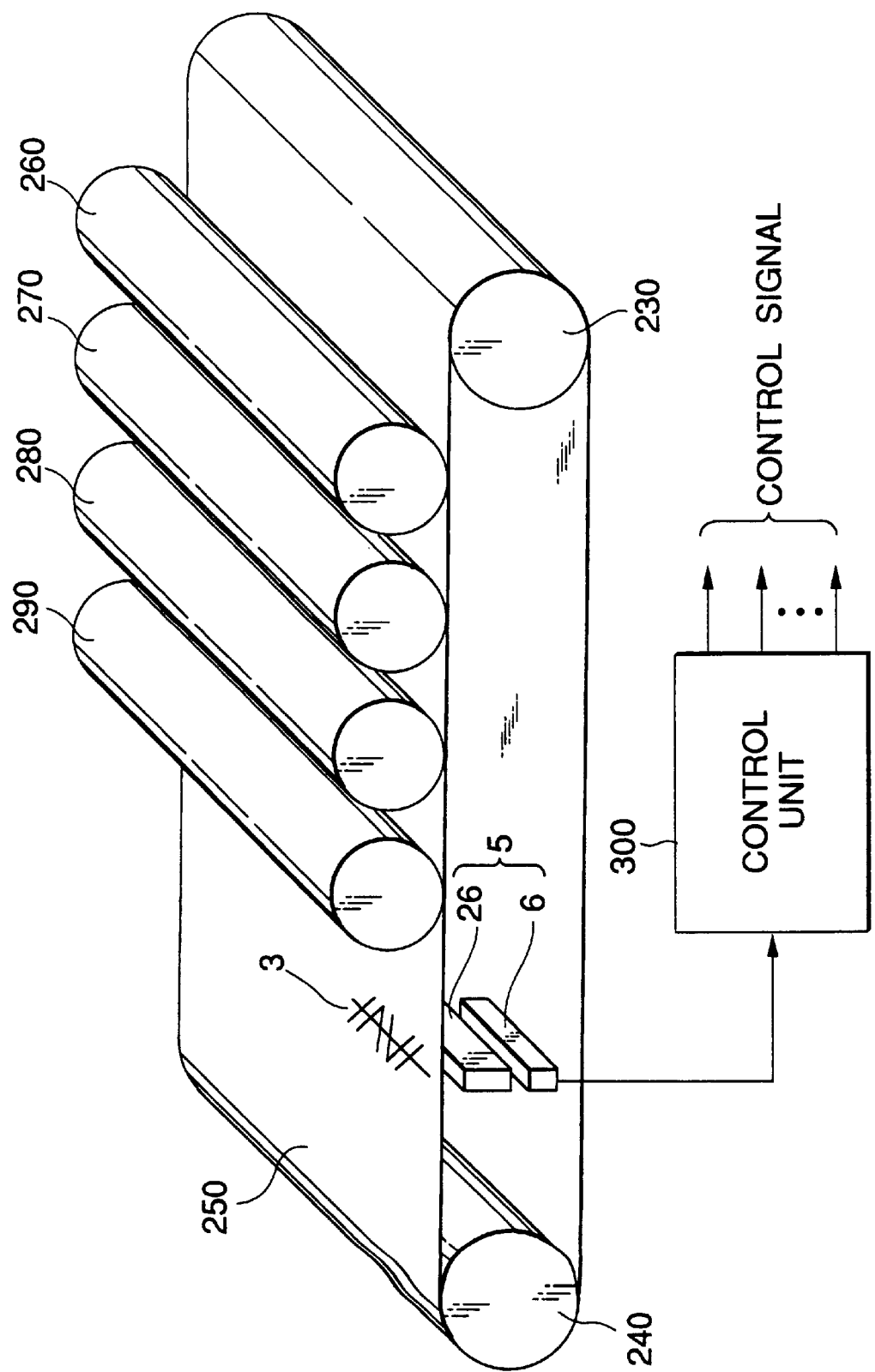

TWO-DIMENSIONAL POSITION/ORIENTATION MEASURING MARK, TWO-DIMENSIONAL POSITION/ORIENTATION MEASURING METHOD AND APPARATUS, CONTROL APPARATUS FOR IMAGE RECORDING APPARATUS, AND CONTROL APPARATUS FOR MANIPULATOR

This is a Divisional of application Ser. No. 08/692,260 filed Aug. 5, 1996. The entire disclosure of the prior application is hereby incorporated by reference herein in its entirety U.S. Pat. No. 5,901,273.

BACKGROUND OF THE INVENTION

The present invention relates to a two-dimensional position/orientation measuring mark, a method and an apparatus for measuring a two-dimensional position/orientation, a control apparatus for an image recording apparatus, and also a control apparatus for a manipulator. More specifically, the present invention is directed to a measuring mark, a measuring method and a measuring apparatus, and an image recording apparatus utilizing these mark, measuring method and apparatus, and also a control apparatus for controlling a manipulator, in which position/orientation can be two-dimensionally measured in a simple manner and at low cost, an easy handily operation can be achieved, and measurement precision does not depend upon speeds of a mark formed medium.

Very recently, in combination with complex works and high-leveled words by robot, strong demands are made to measure two-dimensional positions and orientations in high precision at high speed. For instance, when an object is gripped by a manipulator and a gripped object is located at a proper place, a position and an orientation of this object must be measured in high precision and at high speed.

As the conventional two-dimensional position/orientation measuring apparatus, there is such a measuring apparatus with employment of imaging means such as a television camera as an outer field sensor in order to perform the visual feedback control. In accordance with this two-dimensional position/orientation measuring apparatus, an object under measurement is imaged by the imaging means such as the television camera to thereby produce information about the position/orientation of the object under measurement. Then, the position and orientation obtained from this information are converted into the coordinate values of the coordinate system fixed to the external environment, and both the position and the orientation of the object under measurement are measured in response to a difference between the target coordinate values of this coordinate system and the detected coordinate values obtained from the coordinate conversion.

However, according to this two-dimensional position/orientation measuring apparatus, the two-dimensional sensor such as a CCD is employed as the imaging means of the television camera, and thus the one-frame-data acquisition speed is 1/30 seconds or 1/60 seconds. In general, this data acquisition speed is very slow, as compared with the feedback cycle time of the motor control apparatus for the manipulator, namely less than 1/1000 seconds. Since the pixel quantity of one frame is about 500×500, sufficient resolution cannot be expected. Moreover, since the information amount to be processed becomes large, the exclusively used data processing circuits are required to increase the processing speed, resulting in high cost.

As either the two-dimensional position/orientation measuring apparatus or the two-dimensional position measuring apparatus for solving these problems, there are shown the measuring apparatuses as disclosed in, for instance, the Unexamined Japanese Patent Application Publication Nos. Hei. 3-17503, and Sho. 64-18001.

In the two-dimensional position/orientation measuring apparatus indicated in the Unexamined Japanese Patent Application Publication No. Hei. 3-17503, the one-dimensional optical sensor is arranged on each of the four edges of the regular square. These one-dimensional optical sensors read out the grid-shaped separating lines formed on the semiconductor wafer, and then the position and the orientation of the semiconductor wafer are measured based upon the light reception level distributions of two pairs of one-dimensional optical sensors arranged on the respective opposite edges, and the difference between these light reception level distributions.

Also, in the two-dimensional position measuring apparatus described in the unexamined Japanese Patent Application Publication No. Sho. 64-18001, a point source such as a small bulb is mounted on the object under measurement. The light originated from this point source is collected by way of the light collecting optical system, the collected light beam is splitted by the beam splitter, and the splitted light beams are detected by the one-dimensional sensors along two directions perpendicular to each other. Then, the sensor signal is inputted into the corresponding position detecting circuit to thereby measure the position of the object under measurement.

On the other hand, the Unexamined Japanese Patent Application Publication No. Hei. 6-118735 discloses the control apparatus for the image recording apparatus for detecting the error in the registration of the plural color images formed on the recording medium of the image recording apparatus. This control apparatus for the image recording apparatus is comprised of the first and second mark detectors arranged on the first and second edges of the chevron shaped pattern, and the calculating circuit for inputting therein the mark detection timing signals outputted from the first and second mark detectors to perform a predetermined calculation, whereby the registration error in the plural color images is detected based upon this calculation result. In this control apparatus for the image recording apparatus, the first mark in which two edges of the chevron shaped pattern are made in the first color, the second mark in which two edges of the chevron shaped pattern are made in the second color, and the third mark in which the first edge of the chevron shaped pattern is made in the first color and also the second edge thereof is made in the second color are formed at each of the predetermined timing. The first to third marks are detected by the first and second mark detectors by transporting the recording medium. When the first and second mark detectors detect the first to third marks, these mark detectors output the detection timing signals to the calculating circuit. The calculating circuit enters the detection timing signal therein to execute a predetermined calculation, and detects the registration errors in the first and second color images based on this calculation result. The image recording apparatus controls the registration of the color image based on the detected errors.

However, in accordance with the two-dimensional position/orientation measuring apparatus described in the Unexamined Japanese Patent Application Publication No. Hei. 3-17503, since the one-dimensional optical sensors are arranged on the respective edges of the regular square, at least four sets of one-dimensional optical sensors are required, resulting in high manufacturing cost. On the other hand, according to the two-dimensional position measuring apparatus disclosed in the Unexamined Japanese Patent Application Publication No. Sho. 64-18001, since a large number of optical components involving the imaging lens, the corn-shaped lens, and the beam splitter are required, the measuring apparatus would become complex, resulting in high manufacturing cost. Also, since the point source such as the small bulb is needed, a special care should be taken in order to avoid damages thereof. Furthermore, according to the color registration error detecting apparatus as described in the Unexamined Japanese Patent Application Publication No. Hei. 6-118735, the mark detection timing signal is substituted for the formula while the speed of the recording medium is constant so as to detect the color registration errors. As a result, when a variation is made in the speed of the recording medium, the resultant detection precision would be lowered.

SUMMARY OF THE INVENTION

As a consequence, an object of the present invention is to provide a tow-dimensional position/orientation measuring mark, a two-dimensional position/orientation measuring method and a measuring apparatus, a control apparatus for an image recording apparatus, and a control apparatus for a manipulator, by which low manufacturing cost could be achieved and simple structures could be realized.

Another object of the present invention is to provide a two-dimensional position/orientation measuring mark, a two-dimensional position/orientation measuring method/ apparatus, and a control apparatus for a manipulator, which need not pay any specific attention to handling cares.

A further object of the present invention is provide a tow-dimensional position/orientation measuring mark, a two-dimensional position/orientation measuring method/ apparatus, and a control apparatus for a manipulator, the measuring precision of which does not depend upon a speed of a mark forming medium.

To achieve the above-described objects, a first feature according to the present invention is to provide a two-dimensional position/orientation measuring mark wherein:

the two-dimensional position/orientation measuring mark is formed within a predetermined flat (plan) region; two points of intersection between first and second line segments, and between the second line segment and a third line segment are provided; an angle defined by the first and second line segments, an angle defined by the second and third line segments, and a distance between the two points of intersection are known; one of the two points of intersection constitutes a reference point for measuring a position; and also one of the first, second, and third line segments constitutes a reference line for measuring an orientation.

To achieve the above-described objects, a second feature of the present invention is to provide a two-dimensional position/orientation measuring method for measuring a position and an orientation of an object under measurement deviated on a first flat surface, wherein:

a mark is formed on the object under measurement, which provides two points of intersection between first and second line segments, and between the second line segment and a third line segment, and in which an angle defined by the first and second line segments, another angle defined by the second and third line segments, and a distance between the two points of intersection are known;

at least one set of one-dimensional optical sensor is arranged on a second flat surface;

three line segment images of the first, second, and third line segments contained in the mark are formed on the second flat surface, so that the at least one set of one-dimensional optical sensor produces a light reception signal indicative of a light receiving strength distribution along a longitudinal direction;

in response to the light reception signal, a calculation is made of positions of the first, second, and third line segments on the at least one set of one-dimensional optical sensor; and a position of one of the two points of intersection for the mark, and an inclination of one line segment among the first, second, and third line segments of the mark are calculated based upon the position on at least one set of one-dimensional optical sensor.

To achieve the above-explained objects, a third feature of the present invention is to provide a two-dimensional position/orientation measuring apparatus for measuring a position and an orientation of an object under measurement deviated on a first flat surface, wherein:

a mark formed on the object under measurement, which provides two points of intersection between first and second line segments, and between the second line segment and a third line segment, and in which an angle defined by the first and second line segments, another angle defined by the second and third line segments, and a distance between two points are known;

image forming means for forming line segment images of the first, second, and third line segment contained in the mark on a second flat surface;

at least one set of one-dimensional optical sensor arranged on the second flat surface, for outputting a light reception signal indicative of a light reception intensity distribution along a longitudinal direction based upon the first, second, and third line segment images;

first calculating means for calculating positions of the first, second, and third line segment images on the at least one set of one-dimensional optical sensor based upon the light reception signal; and second calculating means for calculating one position of the two intersection points provided by the first, second, and third line segments contained in the mark, and an inclination of one line segment among the first, second, and third line segments contained in the mark based upon the position of the at least one-dimensional light sensor.

To achieve the above-described objects, a fourth feature of the present invention is to provide a control apparatus for an image recording apparatus for forming a color image by overlapping toner images having different colors, comprising:

image signal producing means for producing an image signal of a mark which provides two points of intersection between first and second line segments, and second and third line segments, and in which an angle defined by the first and second line segments, an angle defined by the second and third line segments, and a distance between the two points of intersection are known;

first image forming means for inputting therein the mark image signal to form a toner image of the mark in a first color at a first position of an image carrier such as a paper sheet and a belt;

second image forming means for inputting therein the mark image signal to form a toner image of the mark in a second color at a second position adjacent to the first position of the image carrier;

at least one set of one-dimensional optical sensor for reading out first, second, and third line segment images contained in the toner images in the first and second colors to thereby output readout signals;

first calculating means for calculating positions of the first, second, and third line segment images contained in the toner images on the at least one set of one-dimensional optical sensor based upon the readout signals;

second calculating means for calculating one position of the two intersection points contained in the toner image of the mark, and an inclination of one line segment among the first to third line segments based upon the position of the at least one set of one-dimensional optical sensor with respect to each of the first and second colors; and control means for calculating an error in registration of the second color toner image with respect to the first color toner image based on a calculation result of the second calculating means and for outputting a control signal used to correct the registration error.

To achieve the above-explained objects, a fifth feature of the present invention is to provide a control apparatus for a manipulator for controlling a position and an orientation of an objective article based upon a position and an orientation of a mark formed on a surface of the objective article, comprising:

an imaging unit mounted on the manipulator, for reading the mark to output a readout signal;

calculating means for inputting the readout signal therein to calculate the position and the orientation of the mark; and control means for controlling the manipulator based on the position and the orientation of the mark, whereby the position and the orientation of the objective article are set to a predetermined position and a predetermined orientation; wherein;

the mark provides two points of intersection between first and second line segments, and between the second line segment and a third line segment, and in which an angle defined by the first and second line segments, another angle defined by the second and third line segments, and a distance between the two points of intersection are known; one of the two intersection points is a reference point; and one line segment among the first to third line segments is a reference line used to measure an orientation.

BRIEF DESCRIPTION OF THE DRAWINGS

FIG. 1A is an explanatory diagram of the entire system; FIG. 1B is an explanatory diagram for showing a mark on an object surface, as viewed from a lower side of FIG. 1A, and FIG. 1C is an explanatory diagram for explaining a one-directional optical sensor of an image forming surface, as viewed from a lower side of FIG. 1A;

FIG. 15 is an explanatory diagram for indicating a modification of the control apparatus for the image recording apparatus according to the first embodiment of the present invention;

DETAILED DESCRIPTION OF THE PREFERRED EMBODIMENTS

Referring now to the accompanying drawings, a detail description will be made of a two-dimensional position/orientation measuring mark, a two-dimensional position/orientation measuring method/apparatus, a control apparatus for an image recording apparatus, and a control apparatus for a manipulator.

FIRST EMBODIMENT

Figure 1A:
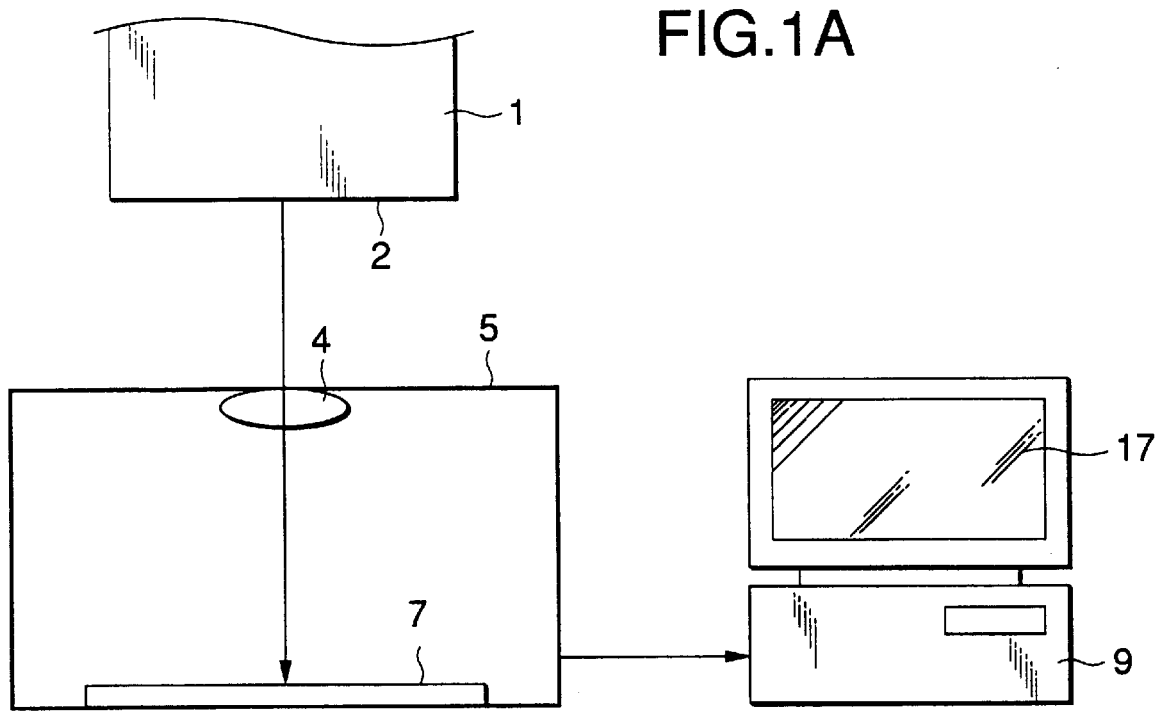
FIGS. 1A to 1C show two-dimensional position/orientation measuring apparatus according to a first embodiment of the present invention.

In FIG. 1A, there is shown a two-dimensional position/orientation measuring apparatus according to a first embodiment mode of the present invention. This two-dimensional position/orientation measuring apparatus is arranged by employing an object under measurement 1 (or object to be measured) which is deviated on a flat surface located parallel to an object surface 2, a light source (not shown) for irradiating light onto the object surface of the object under measurement, an imaging unit 5 for imaging the object surface 2 illuminated by the light source, and a calculation unit 9 for calculating a position and an orientation of the object under measurement 1 based upon a sensor signal outputted from the imaging unit 5 to display the calculated position and orientation on a display unit 17.

The imaging unit 5 is arranged by comprising an imaging lens 4 and an image forming surface 7, and an one-dimensional optical sensor (will be explained later) are arranged on the image forming surface 7.

The calculation unit 9 is a microcomputer and the like, which is equipped with an interface function with the imaging unit 5. This calculation unit 9 contains a memory and a processor such as an ALU.

Figure 1B:
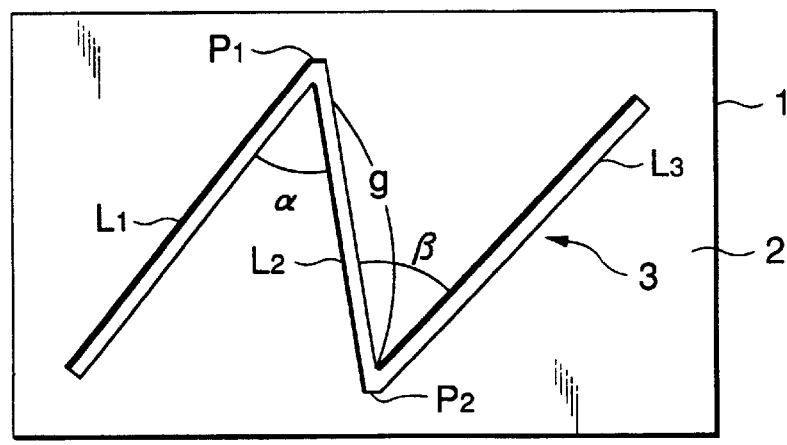

In FIG. 1B, there is indicated a mark 3 formed on the object surface 2. This mark 3 may provide a point of intersection "$P_1$" between a first straight line $L_1$ and a second straight line $L_2$, another point of intersection "$P_2$" between the second straight line $L_3$. A distance "g" between the intersection points $P_1$ and $P_2$, an angle "$\alpha$" defined by the straight lines $L_1$ and $L_2$, and another angle "$\beta$" defined by the straight lines $L_2$ and $L_3$ are known.

The mark 3 is formed in such a manner that paint whose reflectivity is different from that of the object surface 2 is coated on this object surface 2, a seal, or the like which is printed in ink is attached to the object surface 2, and a member made of such a material having different reflectivity from that of the object surface 2 may be attached to the object surface 2. In this embodiment mode, a mark 3 is indicated in black paint on the object surface 2 colored in white. More than four straight lines may be employed, and an attention may be paid to three straight lines capable of satisfying the conditions. Moreover, these straight lines may be a continued line, or a discontinued line. A line segment having a preselected length may be merely defined.

Figure 1C:
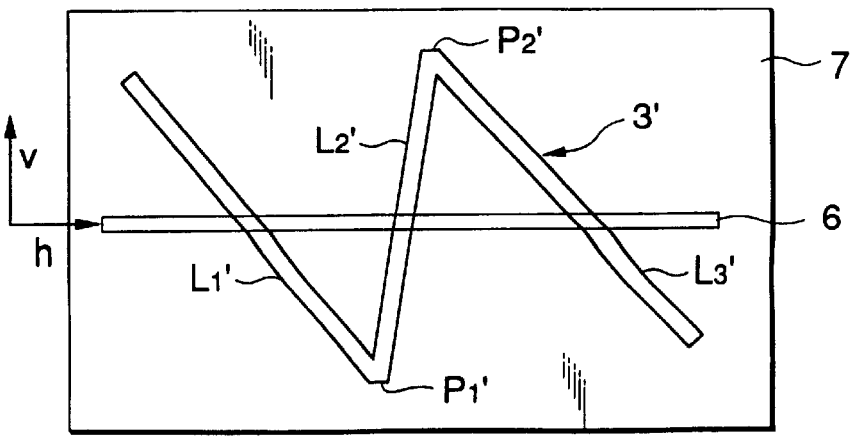

FIG. 1C indicates an image forming surface 7 of the imaging unit 5. As previously described, the one-dimensional optical sensor 6 is arranged on the image forming surface 7. The straight lines $L_1$ to $L_3$ of the mark 3 of the object surface 2 are imaged as a mark image 3' constituted by straight lines $L_1$, to $L_3$, having points of intersection $P_1$, and $P_2$,. Symbol "h-v" denotes a two-dimensional coordinate system.

Figure 2:
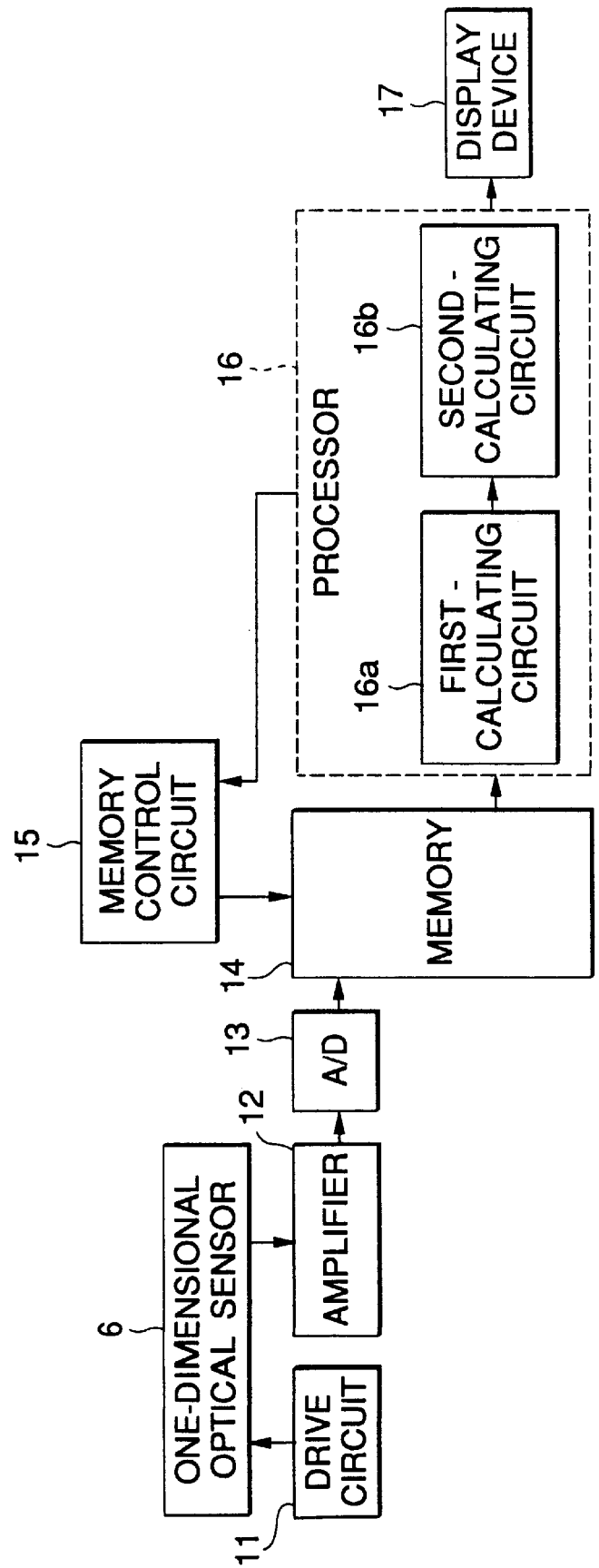
FIG. 2 is a schematic block diagram for representing a system including an imaging unit and a calculating unit in the two-dimensional position/orientation measuring apparatus according to the first embodiment of the present invention.

In FIG. 2, there is shown a system of the above-described imaging unit 5 and calculating unit 9. This system is arranged by a drive circuit 111 for driving the one-dimensional optical sensor 6, an amplifier 12 for amplifying a sensor signal of the one-dimensional optical sensor 6, and an A/D converter 13 for converting the amplified sensor signal into digital data. The system is further constructed of a memory 14 for storing therein the digital sensor signal outputted from the A/D converter 13, a memory control circuit 15 for controlling reading/writing operations of the digital sensor signal from/in the memory 14 by inputting a control signal derived from a processor 16 (will be explained) and by outputting read/write signals to the memory 14, and a processor 16 for calculating a position and an orientation of the object 1 under measurement based upon the sensor signal read from the memory 14, and for displaying the calculation result on a display unit 17. The processor 16 includes a first calculating circuit 16a for calculating positions of the straight lines $L_1$, to $L_3$, on the one-dimensional optical sensor 6, and a second calculating circuit 16b for calculating at least one position of the intersection points $P_1$, $P_2$, and also at least one orientation of the straight lines $L_1$ to $L_3$ based upon the calculation result of the first calculating circuit 16a.

Operations of the above-described circuit arrangement will now be explained.

First, when the object surface 2 is irradiated by the light source (not shown), the light reflected from the object surface 2 containing the mark 3 is collected by the imaging lens 4, so that a mark image "3'" constructed of the straight lings $L_1$, to $L_3$, having the intersection points $P_1$, $P_2$, is imaged on the image forming surface 7.

When the mark image 3' is imaged on the image forming surface 7, a sensor signal indicative of a light intensity distribution is derived from the one-dimensional optical sensor 6. After this sensor signal is amplified by the amplifier 12, the amplified sensor signal is A/D-converted by the A/D converter 13 into the digital data which will then be transferred to the memory 14. The transferred digital sensor signal is written into the memory 14 in response to the write signal outputted from the memory control circuit 15, and also is read from the memory 14 and into the processor 16 in response to the read signal outputted from the memory control circuit 15. The processor 16 calculates the position of the mark image 3' on the one-dimensional optical sensor 6 by the first calculating circuit 16a, and calculates the position and orientation of the object 1 under measurement in the two-dimensional plane. The calculation results are displayed on the display unit 17.

A description will now be made of a method for calculating a two-dimensional position and a two-dimensional orientation, executed in the processor 16.

Figure 3:
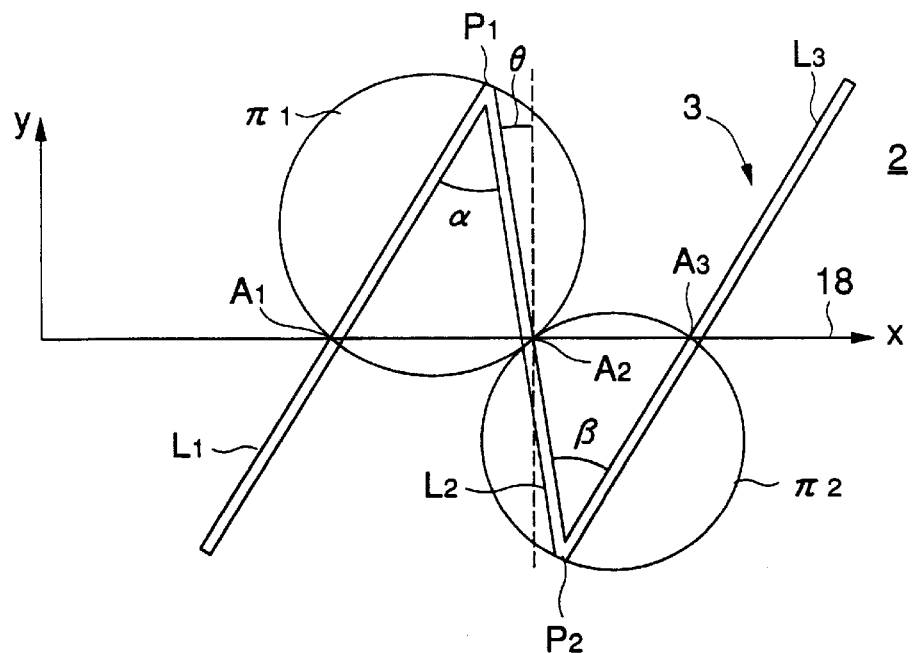
FIG. 3 is an explanatory diagram for showing a position and an orientation of the mark in a two-dimensional coordinate system of the two-dimensional position/orientation measuring apparatus according to the first embodiment of the present invention.

FIG. 3 schematically represents a position and an orientation of the mark 3 in a two-dimensional coordinate system indicated by x-y. In this drawing, there is a read line 18 on the X-axis, which is detected by the one-dimensional optical sensor 6 on the object surface 2.

Figure 4:
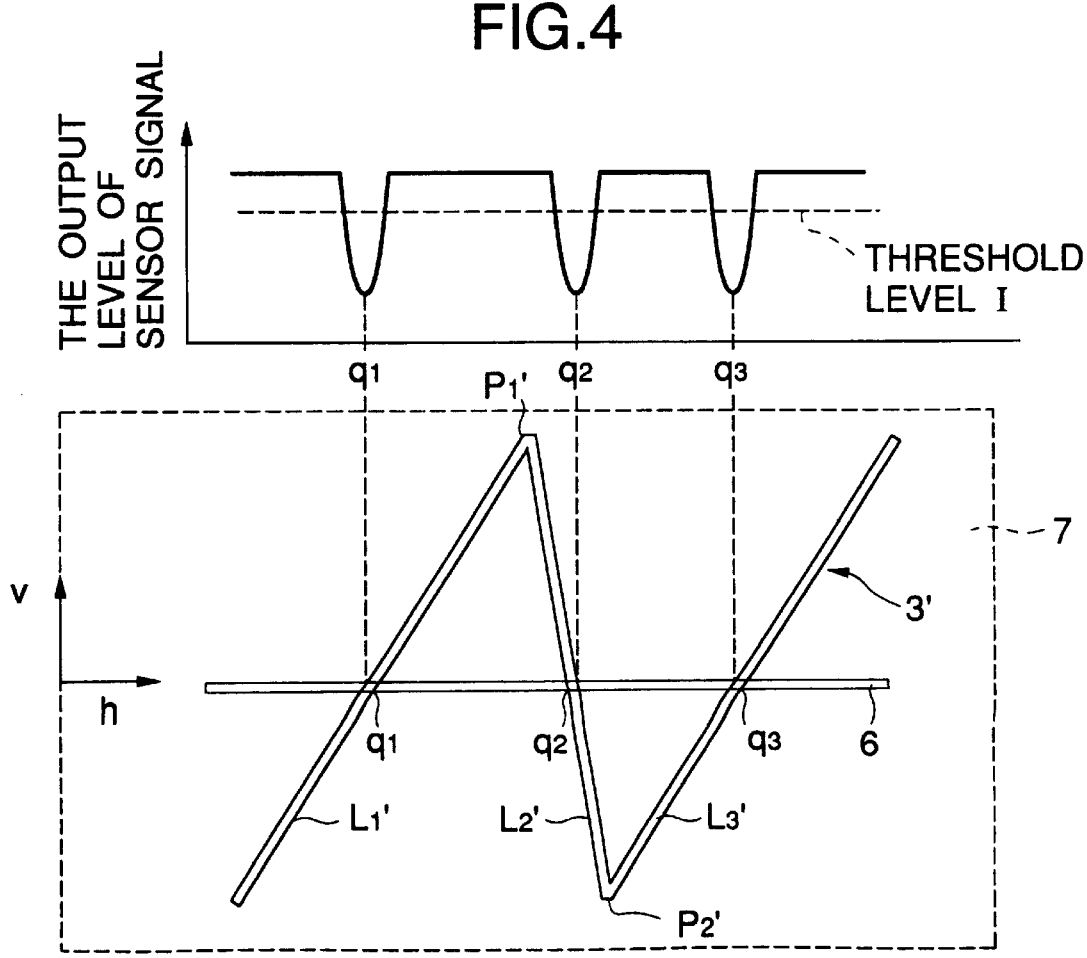
FIG. 4 is an explanatory diagram for indicating a positional relationship between the one-dimensional optical sensor and the straight line of the mark image on the image forming surface in the two-dimensional position/orientation measuring apparatus according to the first embodiment of the present invention.

FIG. 4 shows a positional relationship between the one-dimensional optical sensor 6, and the straight lines $L_1$, to $L_3$, of the mark image 3' on the image forming surface 7.

In FIG. 3, an equation of a straight line of the read line 18 in the two-dimensional coordinate system may be expressed by employing a pixel number "q" of the one-dimensional optical sensor 6 as follows:

$$[x, y]^t = q[a, b]^t + [c, d]^t \quad (1)$$

In this equation, symbol $[ ]^t$ indicates a transposed matrix. Symbol $[a, b]^t$ shows a directional vector of the read line 18, and symbols "c, d" represents a central position of 0th pixel in the two-dimensional coordinate system. A dimension of the vector $[a, b]^t$ is equal to a dimension of the one-dimensional optical sensor 6 per 1 pixel in the two-dimensional coordinate system.

Before the measurement is carried out, the straight line equation of the read line 18 is precalculated. In general, symbols "a, b" are constants. however, in the case that the object surface 2 is not located in parallel to the image forming surface 7, or when the lens distortion becomes large, this distortion is approximated as a constant, symbols "a, b" may be expressed as the function of "q".

Figure 5:
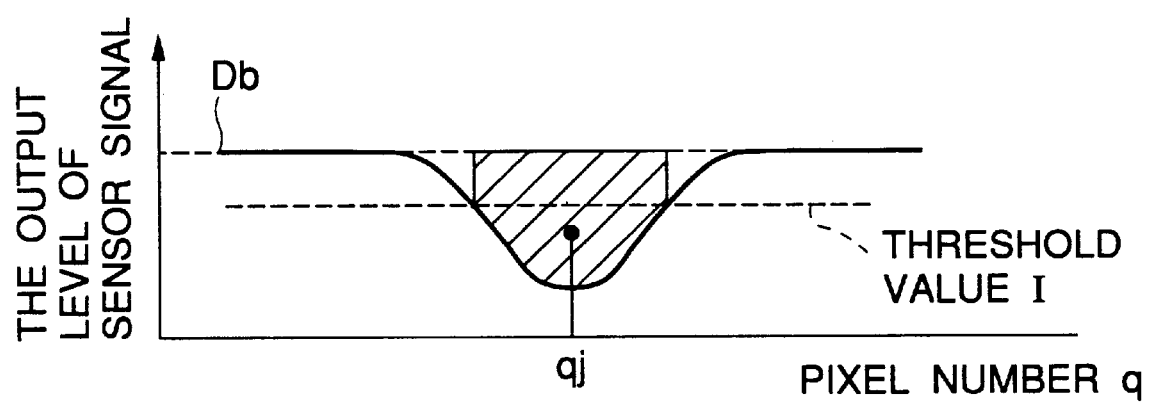
FIG. 5 is an explanatory diagram for showing an output waveform of the one-dimensional optical sensor in the tow-dimensional position/orientation measuring apparatus according to the first embodiment of the present invention.

In FIG. 4, first, the straight line positions "$q^1$" to "$q^3$" of the mark 3' on the one-dimensional optical sensor 6 are calculated. The straight lines $L_1$ to $L_3$ of the mark 3 are such lines having constant widths, and the output levels of the sensor signals are lowered at portions of the images $L_1$, to $L_3$, thereof. Accordingly, as indicated in FIG. 5, positions "qj" (j=1 to 3) of the straight line $L_1$, to $L_3$, of the mark image 3' are calculated as, for example, gravity positions of portions indicated by an inclined line by employing pixel data within such a range lower than, or equal to a properly selected threshold value "I", which is located near this position "qj". At this time, the gravity position "qj" is calculated by way of the following equation (2), for instance:

$$qj = \Sigma\{q(D_b - D(q))\} / \Sigma\{D_b - D(q)\} \quad (2)$$

In this equation (2), symbol $D(q)$ shows an output value in the pixel "q", and symbol $D_b$ indicates the background level.

The first calculating circuit 16a calculates the positions $q_1$ to $q_3$ of the straight lines $L_1$, to $L_3$, of the mark image 3' in this manner. In the second calculating circuit 16b, the calculated positions $q_1$ to $q_3$ are substituted for the equation (1) to thereby calculate positions $A_1(x_1, 0)$ to $A_3(x_3, 0)$ of the straight lines $L_1$ to $L_3$ of the mark 3 in the two-dimensional coordinate system.

In the calculation executed in the second calculating circuit 16b, the intersection point $P_1$ ($P_{1x}$, $P_{1y}$) between the straight lines $l_1$ and $L_2$ of the mark 3 shown in FIG. 3 is recognized as the position of the mark 3; when the straight line $L_2$ of the mark 3 is located in parallel to the y-axis, it is recognized as the reference orientation of the mark 3, and the inclination (gradient) "θ" of the straight line $L_2$ is recognized as the orientation of the mark 3.

It is now assumed in FIG. 3 that an intersection point between the straight lines $L_2$ and $L_3$ is recognized as "$P_2$", a circumscribed circle of a triangle $A_1P_1A_2$ is recognized as "$\pi_1$", and another circumscribed circle of another triangle $A_2P_2A_3$ is recognized as "$\pi_2$". In the circles $\pi_1$ and $\pi_2$, since lengths of line segments $A_1A_2$ and $A_2A_3$, and also angles , β of <$A_1P_1A_2$ and <$A_2P_2A_3$ may be calculated respectively, radiuses $R_1$ and $R_2$ of these circles can be calculated based upon the low of sines. Also, coordinate values of center positions $C_1(c_{1x}, c_{1y})$ and $C_2(c_{2x}, c_{2y})$ of the respective circles are calculated. The equations for the respective circles are given as follows:

$$\pi_1 : (x - c_{1x})^2 + (y - c_{1y})^2 = R_1 \quad (3)$$

$$R_1 = (x_2 - x_1)/2/\sin(\alpha)$$

$$c_{1x} = x_2 - (x_2 - x_1)/2$$

$$c_{1y} = R_1 \cos(\alpha)$$

$$\pi_2 : (x - c_{2x})^2 + (y - c_{2y})^2 = R_2 \quad (4)$$

$$R_2 = (x_3 - x_2)/2/\sin(\beta)$$

$$c_{2x} = x_2 - (x_3 - x_2)/2$$

$$c_{2y} = R_2 \cos(\beta).$$

Now, when the straight line equation of the straight line $l_2$ is defined as:

$$x - x_2 = ky \quad (5),$$

the position $P_1(P_{1x}, P_{1y})$ of the mark 3 is calculated as an intersection point between the circumscribed circle $\pi_1$ and the straight line $L_2$. If the value of k is obtained, then it can be calculated based on the equations (3) and (5) as follows:

$$p_{1y} = \frac{(x_2 - x_1)}{k^2 + 1}\{\cos(\alpha)/\sin(\alpha) - k\} \quad (6)$$

$$p_{1x} = x_2 + k P_{1y} \quad (7)$$

Also, the orientation of the mark 3 may be calculated as the following equation (8):

$$\theta = \tan^{-1}(-k) \quad (8).$$

Then, the value "k" is obtained as follows: Assuming now that the coordinate value of the point $P_2$ is ($P_{2x}$, $P_{2y}$), the position ($P_{2x}$, $P_{2y}$) is expressed by the equations (4) and (5) as follows:

$$p_{2y} = \frac{(x_3 - x_2)}{k^2 + 1}\{(k - \cos(\beta)/\sin(\beta)\} \quad (9)$$

$$p_{2x} = x_2 + k P_{2y} \quad (10)$$

The following equation is obtained by employing the length "g" of the points $P_1$ and $P_2$:

$$(p_{1x} - p_{2x})^2 + (p_{1y} - p_{2y})^2 = g^2 \quad (11A).$$

Then, when the equations (6), (7), (9), and (10) are substituted for the equation (11A) and are simplified, the below-mentioned quadratic equation:

$$\{(x_3 - x_1)^2 - g^2\}k^2 - 2(x_3 - x_1) Fk + F^2 - g^2 = 0 \quad (11B)$$

$$F = (x_3 - x_2) \cos(\beta)/\sin(\beta) + (x_2 - x_1) \cos(\alpha)/\sin(\alpha).$$

As apparent from such a fact that the line segments $P_1$ and $P_2$ can be actually indicated in FIG. 3, the equation (11) corresponds to such an equation necessary having a solution.

Then, when $x_3-x_1=g$, this value "k" is given as follows:

$$k = \frac{F^2 - g^2}{2F(x_3 - x_1)} \quad (12)$$

Also, when $x_3-x_1 \ne g$, this value "k" is given as follows:

$$k = \frac{(x_3 - x_1)F \pm \sqrt{g^2\{(x_3 - x_1)^2 + F^2 - g^2\}}}{(x_3 - x_1)^2 - g^2} \quad (13)$$

Symbol "k" owns two solutions of $k_1$, $k_2$. In this case, the equations are used during the measurement by limiting the range of "k" where the mark is deviated. It is required to judge as to whether or not any one of the values $k_1$ and $k_2$ corresponds to the value k of the real mark. However, in this case, for instance, when both the angles α and β of $<A_1P_1A_2$ and $<A_2P_2A_3$ are 90 degrees, a relationship between $k_1$ and $k_2$ is given as $k_1=-k_2$. This judgement can be readily performed by checking as to whether the value k is positive or negative. Also, in such a case that the angles α and β are equal to other values, if the measurement is carried out while the range of the value is ka<k<kb (ka, kb being certain constants), this judgement can be easily performed. In a practical case, there is no specific difficult matter for the above-explained judgements.

Figure 6:
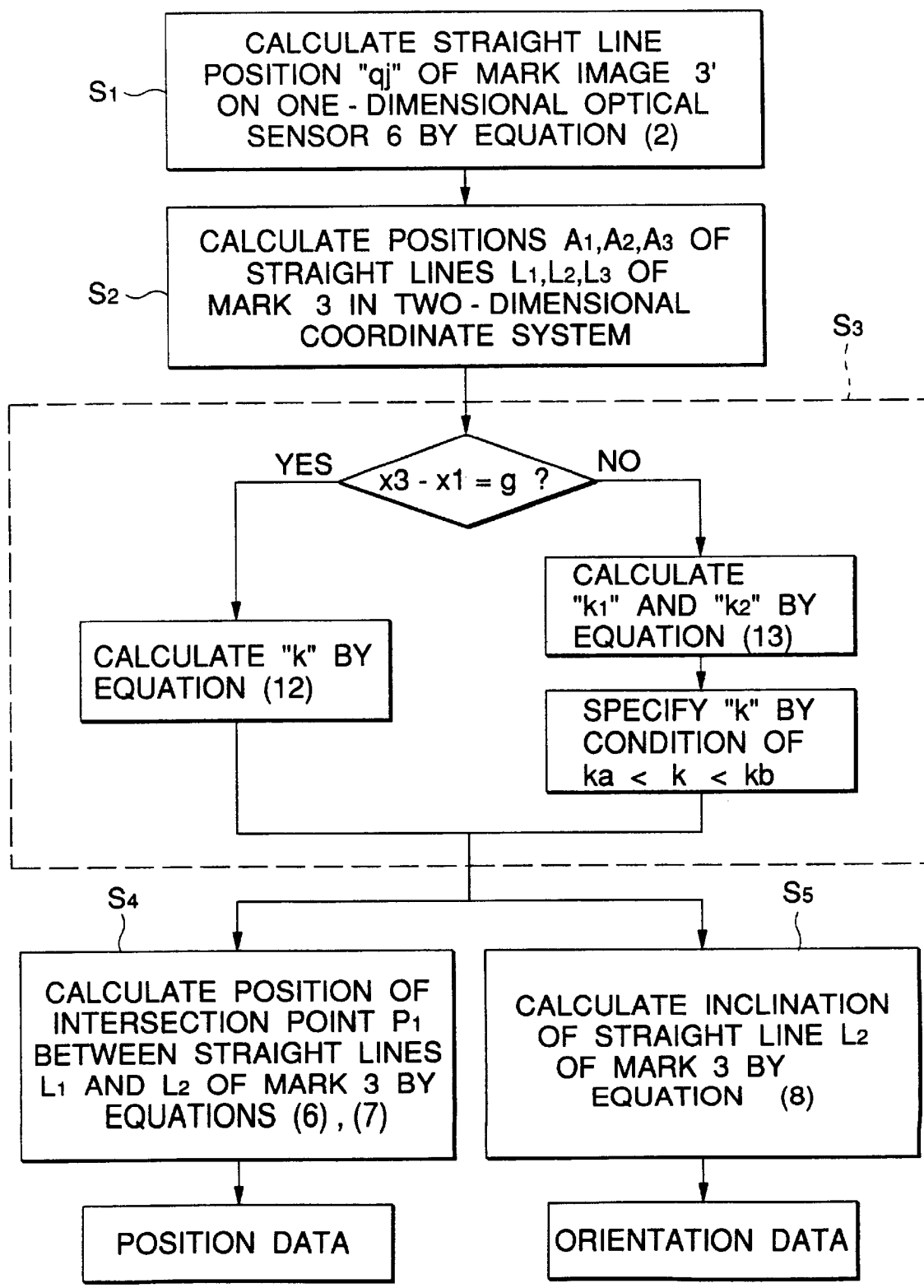
FIG. 6 is a flow chart for showing a calculation sequence executed in the two-dimensional position/orientation measuring apparatus according to the first embodiment of the present invention.

Since the calculations are carried out in accordance with the above-explained sequence, the two-dimensional position and orientation can be obtained. FIG. 6 is a flow chart for explaining operations executed in the processor 16. In this flow operation, the positional data in the two-dimensional field is obtained at steps $S_1$, $S_2$, $S_3$, $S_4$, whereas the orientation data in the two-dimensional field is obtained at step $S_1$, $S_2$, $S_5$.

Figure 7A:
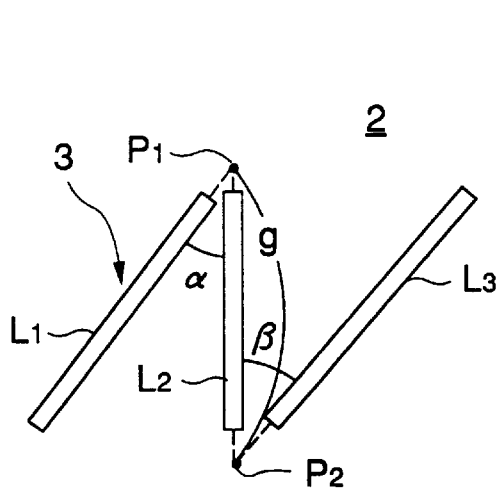
FIGS. 7A to 7C are explanatory diagrams for indicating a modification of the mark in the two-dimensional position/orientation measuring apparatus according to the first embodiment of the present invention.
Figure 7B:
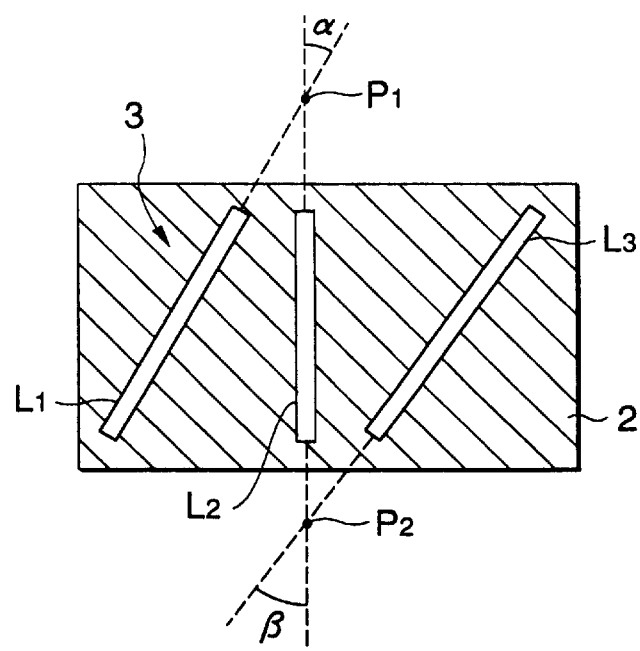
Figure 7C:
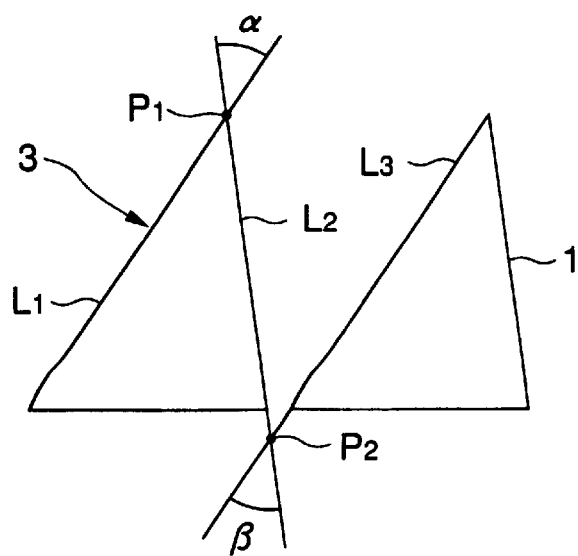

As indicated in FIG. 7A, the mark 3 may be formed by such that while the straight lines $L_1$ to $L_3$ of the mark 3 are separated from each other, the intersection points $P_1$ and $P_2$ are located on an extended line of these straight lines $L_1$ to $L_3$. In addition to the above-described method, as represented in FIG. 7B, the mark 3 may be formed by such that the straight lines $L_1$ to $L_3$ may be formed by such that the straight lines $L_1$ to $L_3$ pass through the object surface 2. Moreover, as indicated in FIG. 7C, such a mark 3 may be employed that a contour line of the object 1 under measurement is the straight lines $L_1$ to $L_3$.

Figure 8:
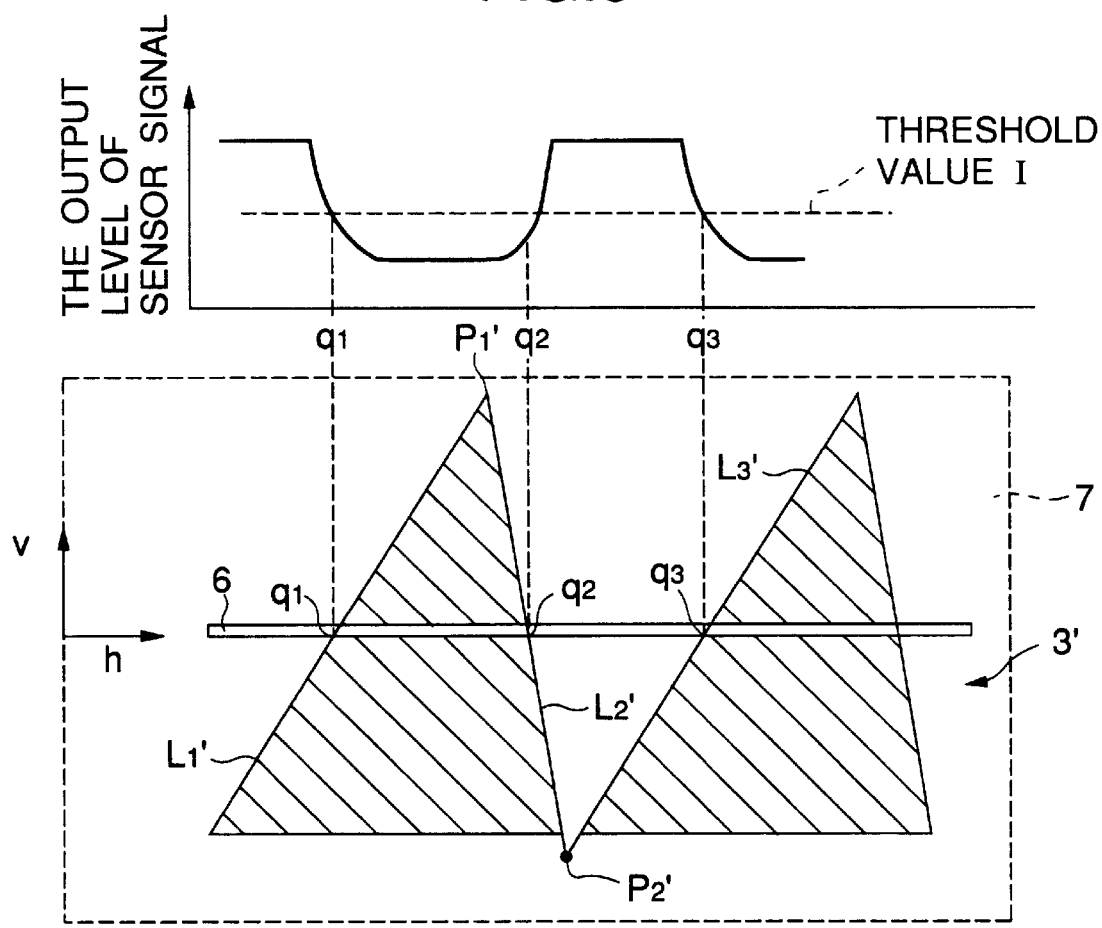
FIG. 8 is an explanatory diagram for indicating a positional relationship between the one-dimensional optical sensor and the straight line of the mark image on the image forming surface in the two-dimensional position/orientation measuring apparatus according to the first embodiment of the present invention.

FIG. 8 schematically represents a relationship between the mark image 3' imaged on the image forming surface 7, the intensity distribution of the sensor signal detected by the one-dimensional optical sensor 6, and the threshold value I. In this case, since the same reference numerals and the same reference symbols used in FIG. 4 are employed as those for denoting the same or similar components in this drawing, no descriptions thereof are made.

Figure 9A:
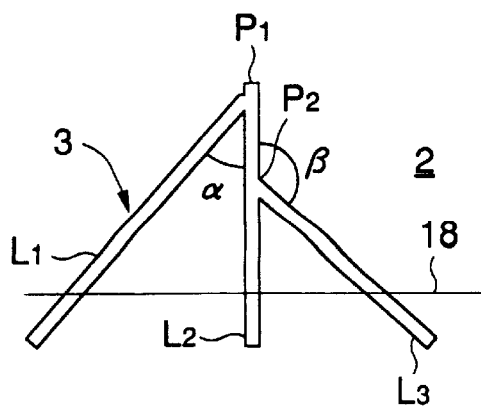
FIGS. 9A and 9B are explanatory diagrams for indicating another modification of the mark in the two-dimensional position/orientation measuring apparatus according to the first embodiment of the present invention.
Figure 9B:
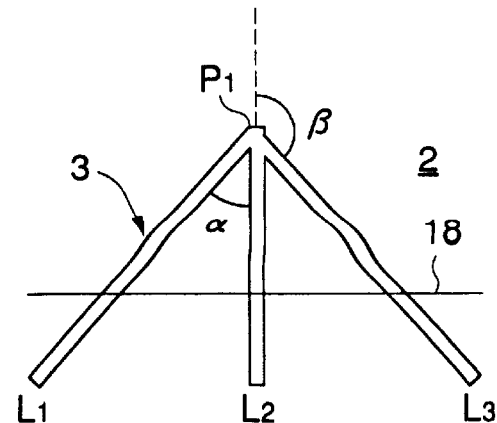

FIGS. 9A and 9B represent other modifications of the mark 3. As shown in FIG. 9A, even when the intersection points $P_1$ and $P_2$ are located on the same side as to the read side as to the read line 18, the calculation can be performed in accordance with the flow chart of FIG. 6. Also, as shown in FIG. 9B, the mark may be realized in such a case that the intersection points of the straight lines $L_1$ to $L_3$ are intersected at one point $P_1$. At this case, as to the explanation related to the above-described calculation, the distance "g" between the points $P_1$ and $P_2$ becomes 0. Based upon the relative equation of $P_{1y}=p_{2y}$, and the above-explained equations (6) and (9), the following equation (14) is defined so as to obtain the value "k" as follows:

$$k = \frac{\{(x_2 - x_1)\cos(\alpha)/\sin(\alpha) + (x_3 - x_2)\cos(\beta)/\sin(\beta)\}}{x_3 - x_1}. \quad (14)$$

In the flow chart shown in FIG. 6, the step $S_3$ is substituted for the equation (14), so that the two-dimensional position and orientation are calculated in a similar manner.

Furthermore, the mark 3 may be formed by way of a groove, or a convex portion. Also, a straight-shaped light source may be used, or fluorescent paint may be coated. If the object 1 under measurement has the light transmittance characteristic, then the mark may be fabricated by employing a material with different light transmittance from that of this mark.

In addition, if the object to be measured is a thin plate-like member, then an opening is provided instead of the mark 3. The object 1 under measurement is sandwiched in this opening, and while the light is irradiated to this object under measurement from the side opposite to the imaging unit 5, light leaked from this object may be detected.

Figure 10:
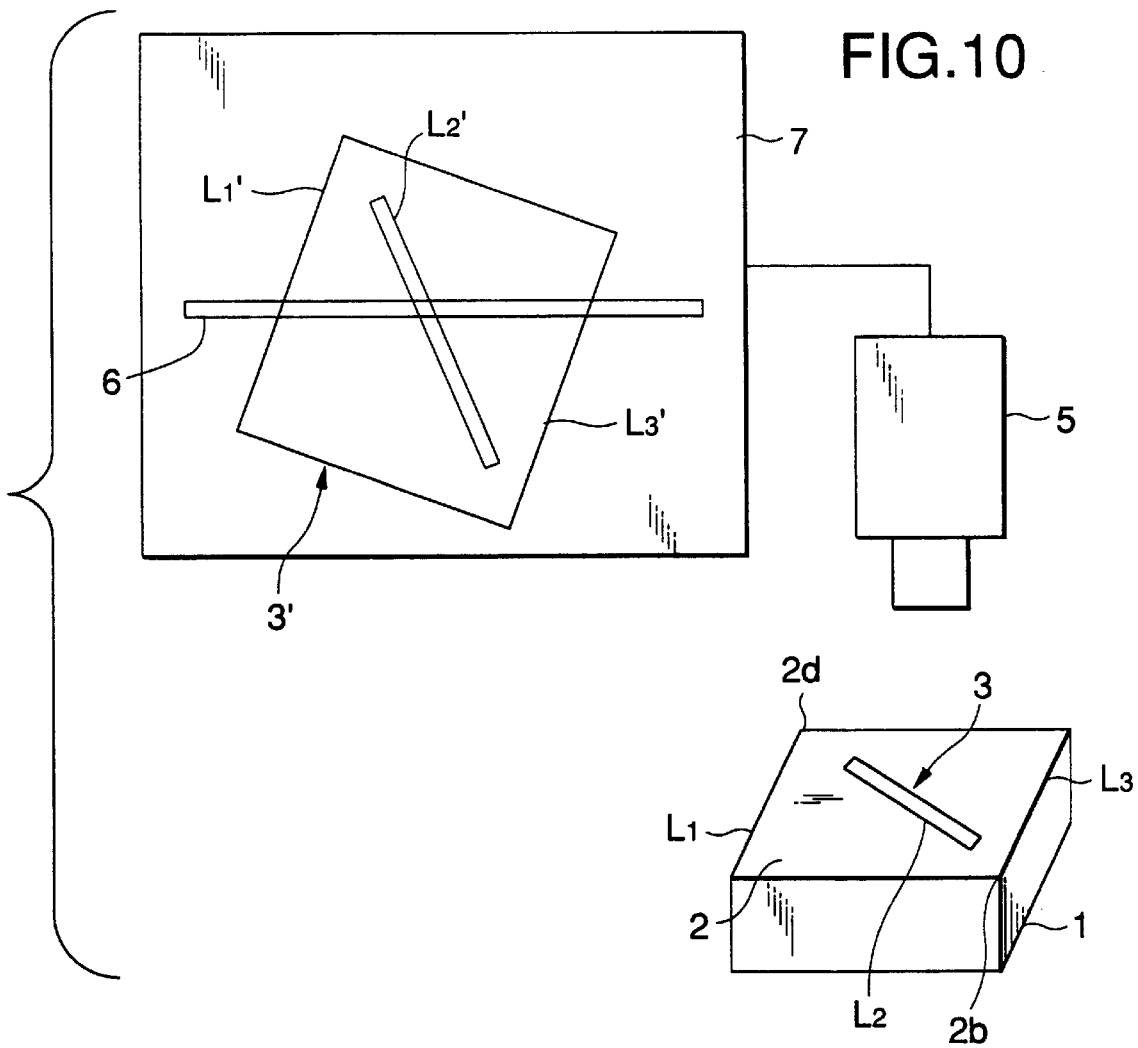
FIG. 10 is an explanatory diagram for indicating a still further modification of the mark in the two-dimensional position/orientation measuring apparatus according to the first embodiment of the present invention.

As shown in FIG. 10, in addition, the straight line $L_2$ may be formed on the object surface 2 of the object 1 under measurement in such a way that two vertexes 2a and 2b which are not adjoined to each other on the object surface 2 are connected, and two opposite edges of the object surface 2 may be utilized as the straight lines $L_1$ and $L_3$ to thereby constitute a mark 3. A mark image 3' having straight lines $L_1$, to $L_3$, may be imaged on the imaging surface 7 of the imaging unit 5.

Figure 11:
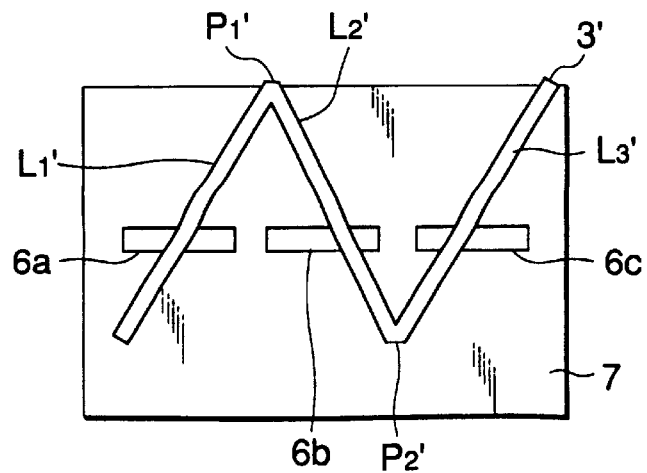
FIG. 11 is an explanatory diagram for indicating a modification f the one-dimensional optical sensor in the two-dimensional position/orientation measuring apparatus according to the first embodiment of the present invention.

FIG. 11 represents a modification of the one-dimensional optical sensor 6 of the imaging unit 5. In this modification, three sets of one-dimensional optical sensors 6a, 6b, 6c are arranged on the same line to detect the straight lines $L_1$, to $L_3$, of the mark image 3. As apparent from the foregoing descriptions, the present invention is not limited to three, but plurality of optical sensors may be arranged on the same line.

Figure 12:
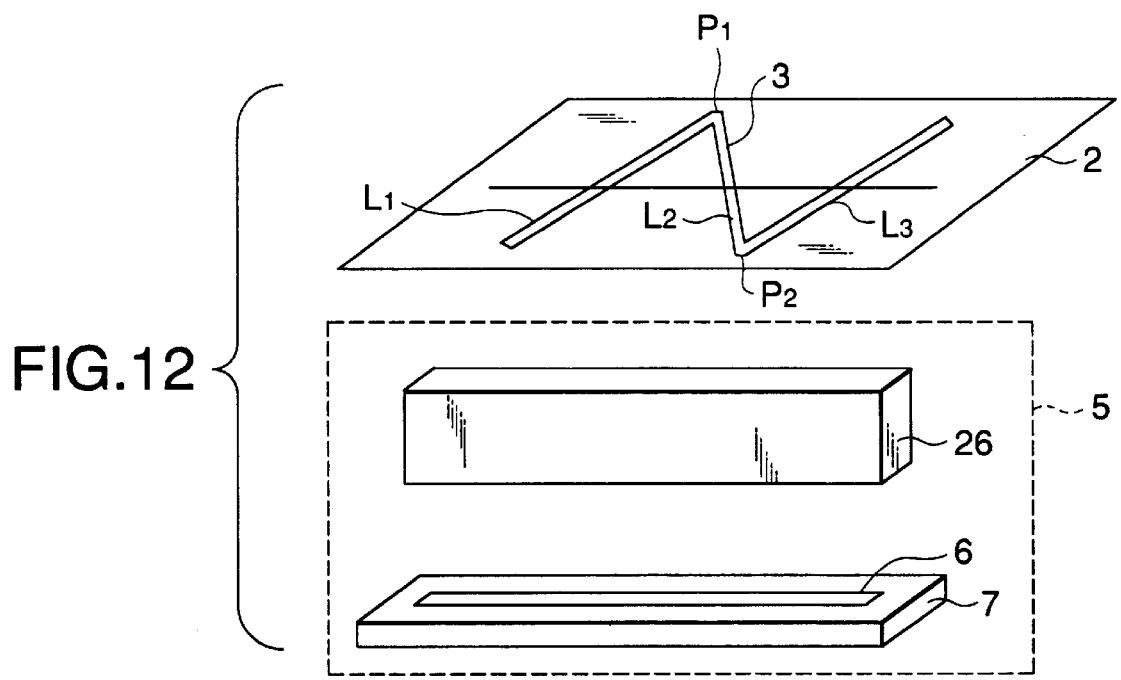
FIG. 12 is an explanatory diagram for indicating a modification of the imaging lens in the two-dimensional position/orientation measuring apparatus according to the first embodiment of the present invention.

In FIG. 12, there is shown a modified embodiment of the imaging unit 5. The imaging unit 5 utilizes such a Selfoc Lens Array 26 capable of forming a real image with equivalent magnification at an upright position instead of the imaging lens. In this case, even when the object surface 2 is slightly varied along the vertical direction, the real image with equivalent magnification at an upright position can be obtained, so that the two-dimensional position and the two-dimensional orientation can be measured within the range where the just focusing operation can be achieved. The three straight lines $L_1$ to $L_3$ may be read by utilizing the Selfoc Lens Array and the one-dimensional optical sensors, separately. At this time, the respective one-dimensional optical sensors may be arranged on separate planes having stepped portions, which are located in parallel to each other.

Even in the above-described modified embodiments, the two-dimensional positions and orientations can be measured in accordance with the flow operation shown in FIG. 6.

Figure 13:
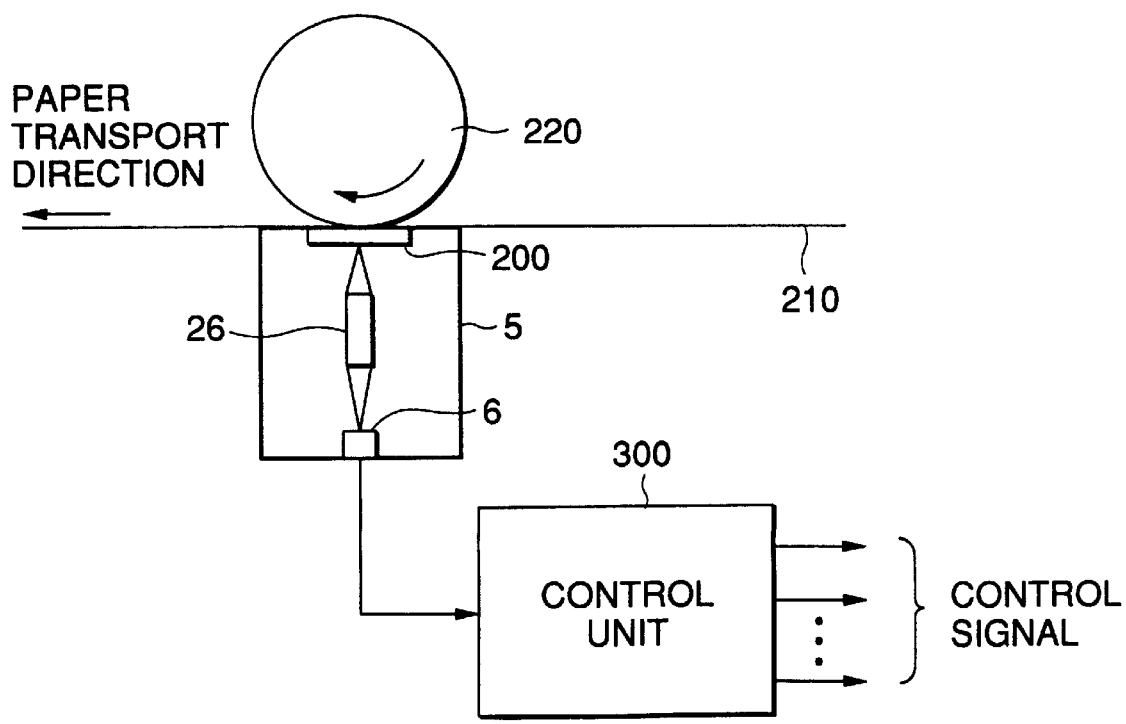
FIG. 13 is an explanatory diagram for indicating a control apparatus for an image recording apparatus according to a first embodiment of the present invention.

FIG. 13 represents a control apparatus for an image recording apparatus according to a first embodiment of the present invention. This control apparatus for the image recording apparatus includes an imaging unit 5 at a transport path 210 for transporting a paper sheet 200 on which an image formed by overlapping colors of yellow (Y), magenta (M), cyan (C), and black (K) is recorded. The output from the imaging unit 5 is connected to a control unit 300. The imaging unit 5 contains the Selfoc Lens Array 26 and the one-dimensional optical sensor 6. The control unit 300 includes the memory 14, the memory control circuit 15, and the processor 16 and the like, which have been explained in FIG. 2. A platen roll 220 is provided on the side opposite to the imaging unit 5 with respect to the transport path 210.

With the above-described arrangement, the marks 3 colored in black and magenta are formed on the paper sheet 200 by the respective color image forming members provided at the upper stream of the transport path 210.

Figure 14A:
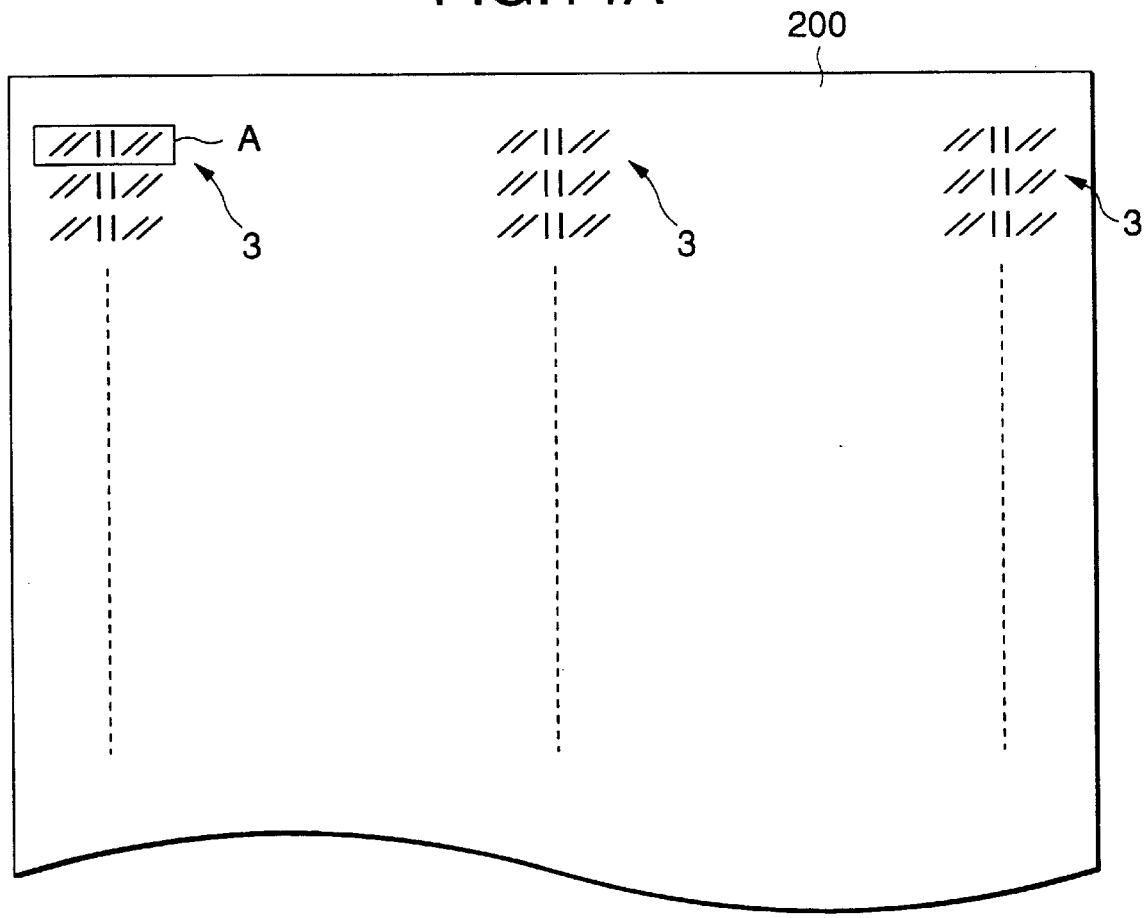
FIGS. 14A and 14B are explanatory diagrams for showing a mark formed on a paper sheet in the control apparatus for the image recording apparatus according to the first embodiment of the present invention.

FIG. 14A represents the marks formed on the central portion and the right and left sides of the paper sheet 200.

Figure 14B:
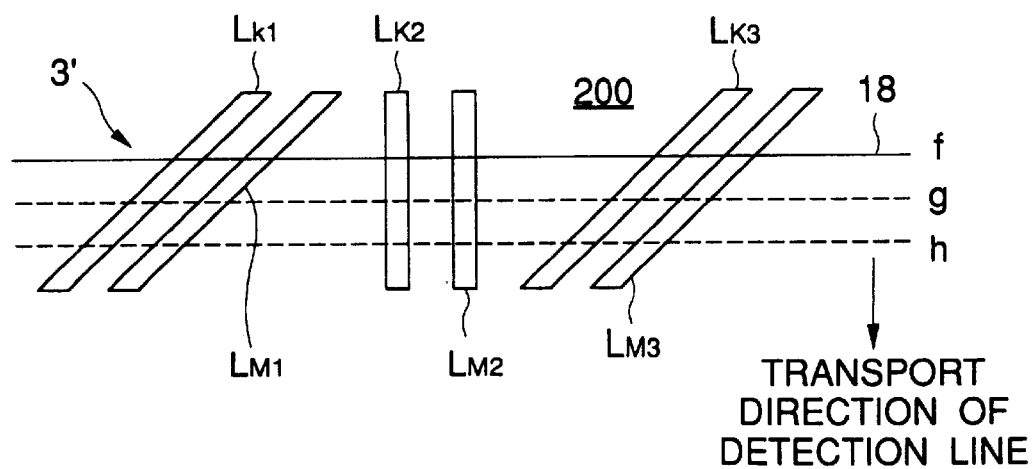

FIG. 14B shows an enlarged portion "A" of FIG. 14A. The mark 3 colored in black (K) owns three straight lines $L_{K1}$, $L_{K2}$, $L_{K3}$, which provide points of intersection $P_{K1}$ and $P_{K2}$ (not shown) on the extended line, whereas the mark 3 colored in magenta (M) has three straight lines $L_{M1}$, $L_{M2}$, $L_{M3}$, which provide other intersection points $P_{M1}$ and $P_{M2}$ (not shown) on the extended line.

When the paper sheet 200 reaches at a position of the detection line 18 of the imaging unit 5, a portion indicated as "f" of the mark 3 is read by the one-dimensional optical sensor via the Selfoc Lens Array 26. When the one-dimensional optical sensor 6 reads the marks 3 colored in black (K) and in magenta (M), the read signal is outputted to the control unit 300. Upon receipt of the read signal, the control unit 300 detects the positions and orientations of the marks 3 colored in black (K) and in magenta (M) in accordance with the above-described flow chart of FIG. 6, and then calculates the registration error in magenta (M) by way of the equation (15), while using the black mark as a reference:

$$\begin{pmatrix} C_L \\ C_P \end{pmatrix} = \begin{pmatrix} \cos\theta & -\sin\theta \\ \sin\theta & \cos\theta \end{pmatrix} \begin{pmatrix} x_2 - x_1 \\ y_2 - y_1 \end{pmatrix} - \begin{pmatrix} a \\ b \end{pmatrix}, \quad (15)$$

where: symbols are defined as follows:
$C_L$: registration error of magenta (M) in lateral direction,
$C_P$: registration error of magenta (M) in process direction,
$x_1$: x-coordinate of mark 3 colored in black (K),
$y_1$: y-coordinate of mark 3 colored in black (K),
$x_2$ : x-coordinate of mark 3 colored in magenta (M),
$y_2$: x-coordinate of mark 3 colored in magenta (M),
θ: orientation of mark 3 colored in black (K),
a: reference orientation of mark 3 colored in black (K), and ideal deviation along x direction for mark 3 colored in magenta (M) when θ=0,
b: reference orientation of mark 3 colored in black (K), and ideal deviation along y direction for mark 3 colored in magenta (M) when θ=0.

Since the paper sheet 200 is transported along the transport direction, when a portion of the mark 3 denoted as "g", and subsequently a portion thereof indicated as "h" are reached to the detection line 18, these portions are read in a similar manner to the portion of the mark 3 indicated as "f", the registration error of the mark colored in magenta (M) is detected with respect to the mark 3 colored in black (K). In this manner, a detection is made of registration errors in approximately 30 portions "f", "g", "h", . . . , of the mark 3. An average value is calculated from a total value of these registration errors, which will then be used as the registration error of the mark colored in magenta (M). The control unit 300 outputs a control signal based upon this registration error, and controls the magenta (M) image forming member so as to correct the magenta (M) registration error. Since various correction methods may be conceived, a proper selection may be employed from, for instance, an exposure timing control of a magenta (M) image signal, and a speed control of a magenta (M) photosensitive member.

Similarly, the registration errors in yellow (Y) and cyan (C) mark with respect to the black (K) mark are detected, and then based upon the detection result, the registration errors are corrected.

Generally speaking, in an electrophotographic recording apparatus, an error in registration is used as one of quality evaluation references for a color image. In commercial reasons, this registration error may be suppressed less than 125 micrometers. When the pixel density is selected to be 400 DPI, an outline of a color image becomes a wave shape with an amplitude larger than, or equal to 10 micrometers.

As a consequence, in accordance with the control apparatus for the image recording apparatus according to the present invention, for example, when the portion "f" of the mark 3 is read only once, it could not correct the registration error less than 10 micrometers. In view of this point, according to the above-described embodiment, approximately 30 portions "f", "g", "h", . . . , of the mark 3 are read. Then, the registration error is detected based upon the averaged value of this detection results. As a result, in such a case that the registration error is detected by employing the one-dimensional sensor of 400 DPI, a confirmation could be established such that the registration error could be detected in precision lower than 3 micrometers.

FIG. 15 represents a modification of the control apparatus for the image recording apparatus according to the first embodiment of the present invention since the same reference numerals of FIG. 13 will be employed as those for denoting the same components of FIG. 15, explanations thereof are omitted. The marks 3 colored in black (K) and in magenta (M) are formed on an intermediate transfer belt 250. The intermediate transfer belt 250 is tensioned between a drive roll 230 and a support roll 240. At the respective color transfer positions of the intermediate transfer belt 250, photosensitive drums 260, 270, 280, 290 are provided on which a black (K) toner image, a yellow (Y) toner image, a magenta (M) toner image, and a cyan (C) toner image are formed.

With the above-described arrangement, operations thereof are the same as those as previously explained in FIG. 13, and FIGS. 14A and 14B. However, there is only such a difference in the operation for forming the mark 3 on the intermediate transfer belt 250, instead of the formation of the mark 3 on the paper sheet 200.

Figure 16:
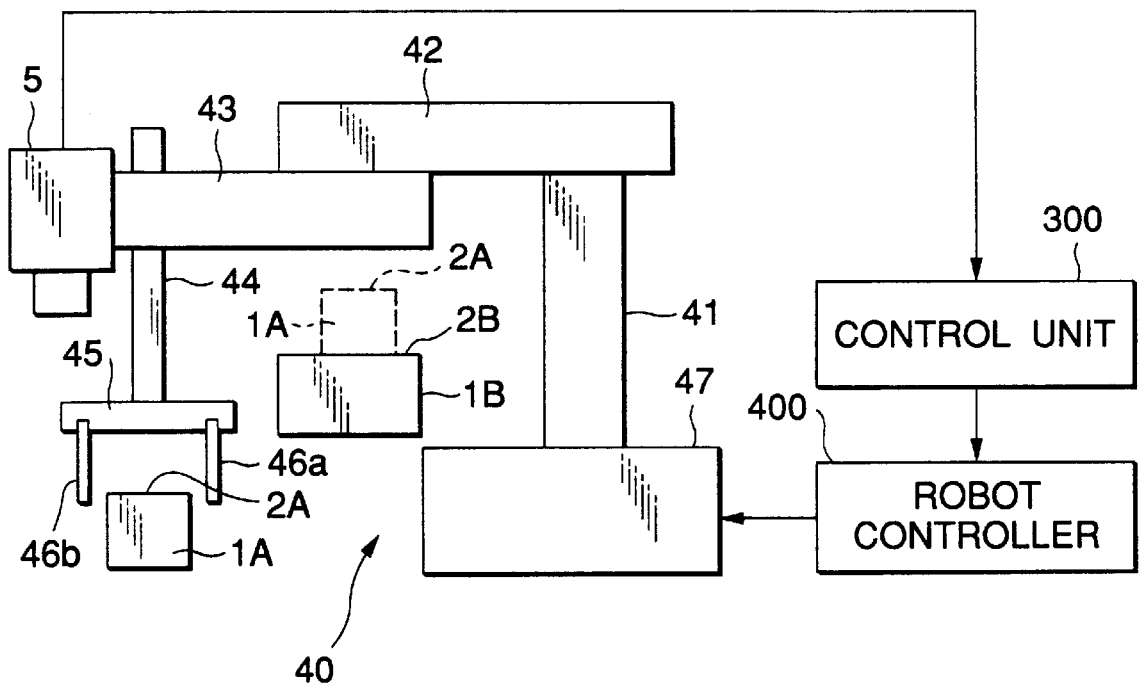
FIG. 16 is an explanatory diagram for showing a control apparatus for a manipulator according to a first embodiment of the present invention.

FIG. 16 illustrates a control apparatus for a manipulator according to a first embodiment of the present invention. This control apparatus for the manipulator is designed to control a robot 40. The control apparatus for the manipulator is arranged by an imaging unit 5 for reading marks 3 (not shown) of object surfaces 2A, 2B of object articles 1A, 1B to thereby output readout signals; a control unit 300 containing the memory 14, memory control circuit 15, and processor 16 as indicated in FIG. 2; and a robot controller 400 for inputting therein the control signal derived from the control unit 300 to control the robot 40. The imaging unit 5 owns such a structure as shown in FIG. 1A or FIG. 5. The marks 3 as indicated in FIG. 1B and FIGS. 7A, 7B, 7C are formed on the object surfaces 2A and 2B. Also, the robot 40 includes a vertical post 41 fixed on a base 47, a first rotary arm 42 which is rotated around the vertical post 41 as a shaft; a second rotary arm 43 rotated on a supporting shaft (not shown) of the first rotary arm 42, a vertical arm 44 moved along the vertical direction, while being supported to the second rotary arm 43, a band 45 provided at a lower end of the vertical arm 44, and also grippers 56a and 56b provided on the band 45.

With the above-described arrangement, the imaging unit 5 read out the mark 3 formed on the object surface 2A of the object article 1A and supplies the readout signal to the control unit 300. The control unit 300 detects the position and the orientation of the mark 3 in accordance with the operations defined in the flow chart shown in FIG. 6, and then outputs the detection signals to the robot controller 400. The robot controller 400 controls the first rotary arm 42, the second rotary arm 43, the vertical arm 44, and the grippers 46a and 46b to thereby cause the grippers 46a and 46b to grip the object article 1A. When the grippers 46a and 46b grip the object article 1A, the robot controller 400 controls the first and second rotary arms 42 and 43 to transport the imaging unit 5 immediately above the object surface 2B of the object article 1B. When the imaging unit 5 reaches immediately above the object surface 2B of the object article 1B, the imaging unit 5 reads the mark 3 formed on the object surface 2B to thereby supply the read signal to the control unit 300. The control unit 300 detects the position and the orientation of the mark 3 based upon the operations defined in the flow chart shown in FIG. 6 to thereby output the detected position and orientation to the robot controller 400. The robot controller 400 controls the first and second rotary arms 42 and 43, the vertical arm 44, and the grippers 46a and 46b to couple the object article 1B with the object article 1A in a preselected relationship. Although the above-described embodiment has described such an operation that the object article 1A is coupled with the object article 1B, the present invention is not limited thereto. Alternatively, for instance, the present invention may be applied to such various operation modes that the object article is transported from a first position to a second position, and the coupled article is dissolved.

Figure 17:
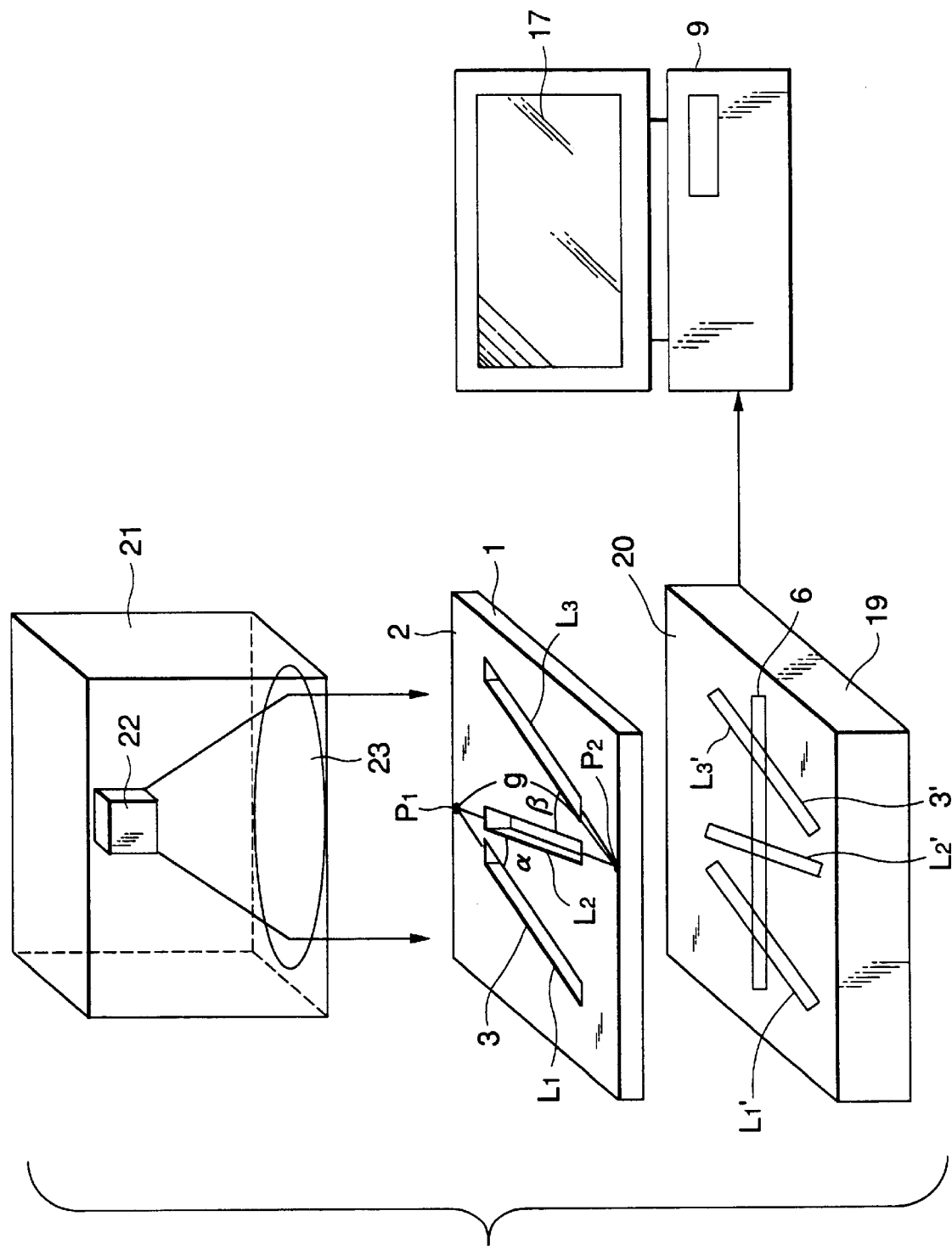
FIG. 17 is an explanatory diagram for showing a two-dimensional position/orientation measuring apparatus according to a second embodiment of the present invention.

FIG. 17 illustrates a two-dimensional position/orientation measuring apparatus according to a second embodiment of the present invention. It should be noted that since the same reference numerals shown in FIG. 1 are employed as those for denoting the same or similar components, further explanations thereof are omitted. This two-dimensional position/orientation measuring apparatus is constructed of a plate-like object 1 under measurement, on which an ark 3 made of straight lines $L_1$ to $L_3$ having openings with constant widths is formed; a light source 21 for irradiating light toward the object 1 under measurement; a one-dimensional image unit 19 located opposite to the light source 21 with sandwiching the object 1 under measurement; and a calculation unit 9 for calculating a two-dimensional position and a two-dimensional orientation of the mark 3 based upon the sensor signal derived from the one-dimensional image unit 19.

The mark 3 provides a point of inter section $P_1$ between the first straight line $L_1$ and the second straight line $L_2$, and also another point of intersection $P_2$ between the second straight line $L_2$ and the third straight line $L_3$. A distance "g" between these intersection points, an angle "α" defined by the straight lines $L_1$ and $L_2$, and another angle "β" defined by the straight lines $L_2$ and $L_3$ are known. The light source 21 collimates light emitted from a lamp 22 by using a projection lens 23, and then irradiates the collimated light to the object under measurement 1. In the one-dimensional image unit 19, the one-dimensional optical sensor 6 is arranged on a light receiving surface 20. This one-dimensional image unit 19 is constructed in such a manner that the straight lines $L_1$ to $L_3$ of the mark image 3' intersect the one-dimensional optical sensor 6 on the light receiving surface 20 of this unit 19.

The calculation unit 9 is constituted by a microcomputer equipped with an interface function with the one-dimensional image unit 19. Now, the object 1 under measurement is deviated in parallel to a certain flat surface. When a measurement is carried out for the two-dimensional position and the two-dimensional orientation of this object 1 under measurement on a certain flat surface, a two-dimensional coordinate system is set to a flat surface to be measured, and then both the light source 21 and the one-dimensional image unit 19 are arranged in such a manner that the optical path of the irradiation light from the light source 21 is located perpendicular to the flat surface where the two-dimensional coordinate system. Also, the one-dimensional image unit 19 is arranged in such a way that the light receiving surface is located perpendicular to the optical path of the irradiation light, namely the one-dimensional optical sensor 6 is located perpendicular to the optical path of the irradiation light. Since the one-dimensional image unit 19 and the calculation unit 9 are identical to the imaging unit 5 and the calculation unit 9, they are omitted.

SECOND EMBODIMENT

Next, a description will now be made of a method for calculating a two-dimensional position and a two-dimensional orientation according to the second embodiment.

First, a calculation is made of positions of the straight lines $L_1$ to $L_3$, of the projected mark image 3' on the one-dimensional optical sensor 6.

Figure 18:
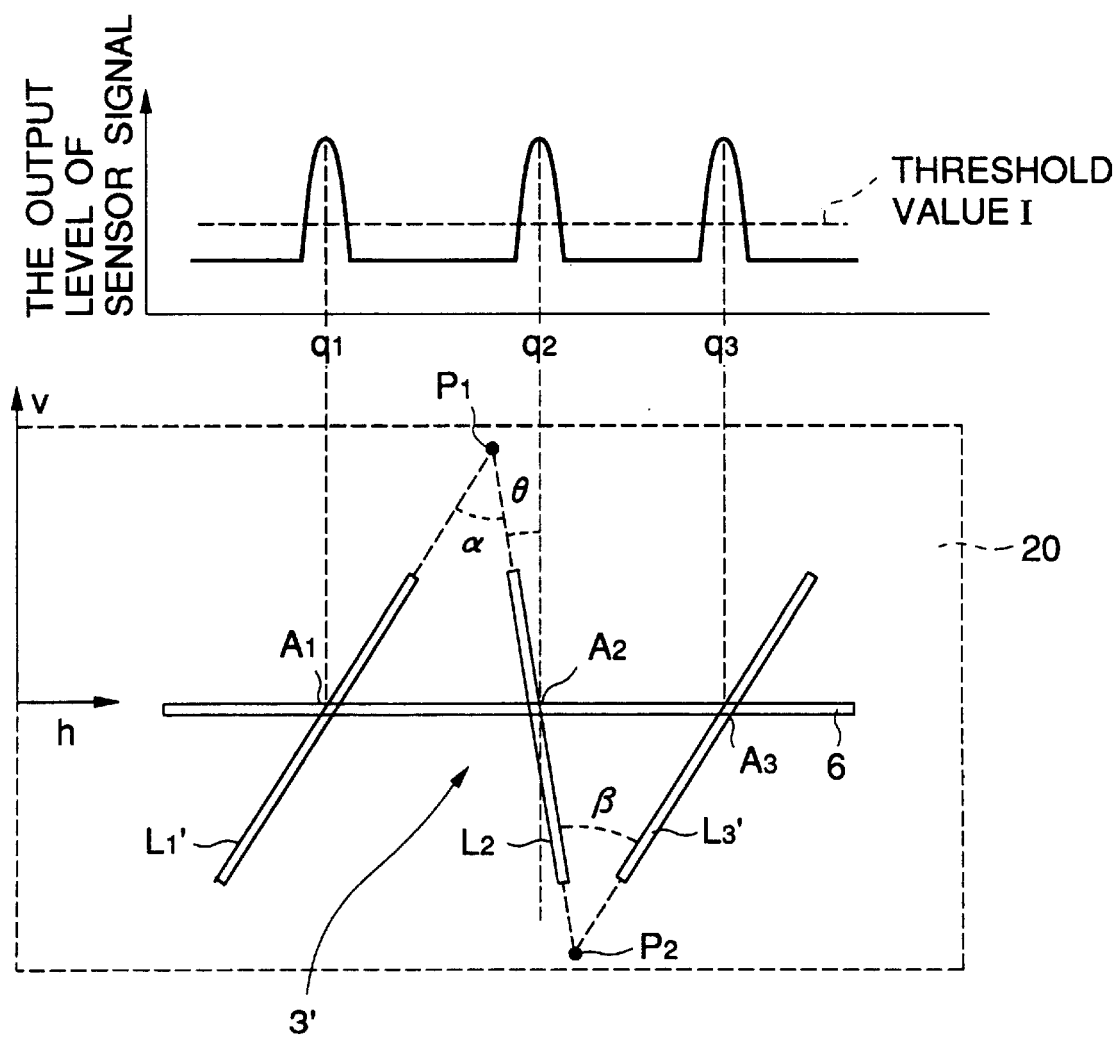
FIG. 18 is an explanatory diagram for representing a positional relationship between a one-directional optical sensor and a straight line of a mark image on an image forming surface in the two-dimensional position/orientation measuring apparatus according to the second embodiment of the present invention.

FIG. 18 represents a positional relationship between the straight lines $L_1$, to $L_3$, of the mark image 3' and the one-dimensional optical sensor 6. As explained above, the straight lines $L_1$ to $L_3$ are openings having constant widths, and the output level of the sensor signal from the one-dimensional optical sensor 6 is increased at portions of the straight lines $L_1$, to $L_3$, of the mark images 3'. As a consequence, for instance, a position "qj" (j=1 to 3) of the straight lines $L_1$, to $L_3$, of the j-th mark image 3' on the one-dimensional optical sensor 6 may be calculated in accordance with an equation (16) by employing pixel data "q" of a range such that a threshold value is larger than a proper threshold value "I" at a neighbor position;

$$qj = \Sigma\{qD(q)\}/\Sigma D(q) \qquad (16),$$

where symbol D(q) indicates an output values in the pixel "q".

Also, in the two-dimensional coordinate system, the one-dimensional optical sensor 6 may be expressed by employing the pixel number "q" as follows:

$$[x, y]^t = q[a, b]^t + [c, d]^t \qquad (17),$$

where symbol $[a, b]^t$ is a directional vector having a dimension of a pixel pitch, and symbol $[c, d]^t$ shows a central coordinate vale of 0-th pixel. At this time, the position "$q_1$" to "$q_3$" of the straight lines $L_1$, to $L_3$, of the mark image 3' on the one-directional optical sensor 6 are converted into positions $A_1$ to $A_3$ of the opening in the two-dimensional coordinate system by way of the equation (7). Based upon the positional $A_1$ to $A_3$ of the straight lines $L_1$ to $L_3$ of the openings, which are obtained in the above manner, it is now assumed that the intersection point $P_1$ (x, y) between the straight lines $L_1$ and $L_2$ of the openings is recognized as a position to be measured, and also when the straight line $L_2$ is located in parallel to y-axis, this straight line $L_2$ is recognized as a reference orientation (θ=0), an inclination "k" of the straight line $L_2$ is calculated in a manner similar to that of the above-explained embodiment. Then, both the two-dimensional position and the two-dimensional orientation of the object 1 under measurement can be calculated based on the equations (6), (7), and (8).

Figure 19:
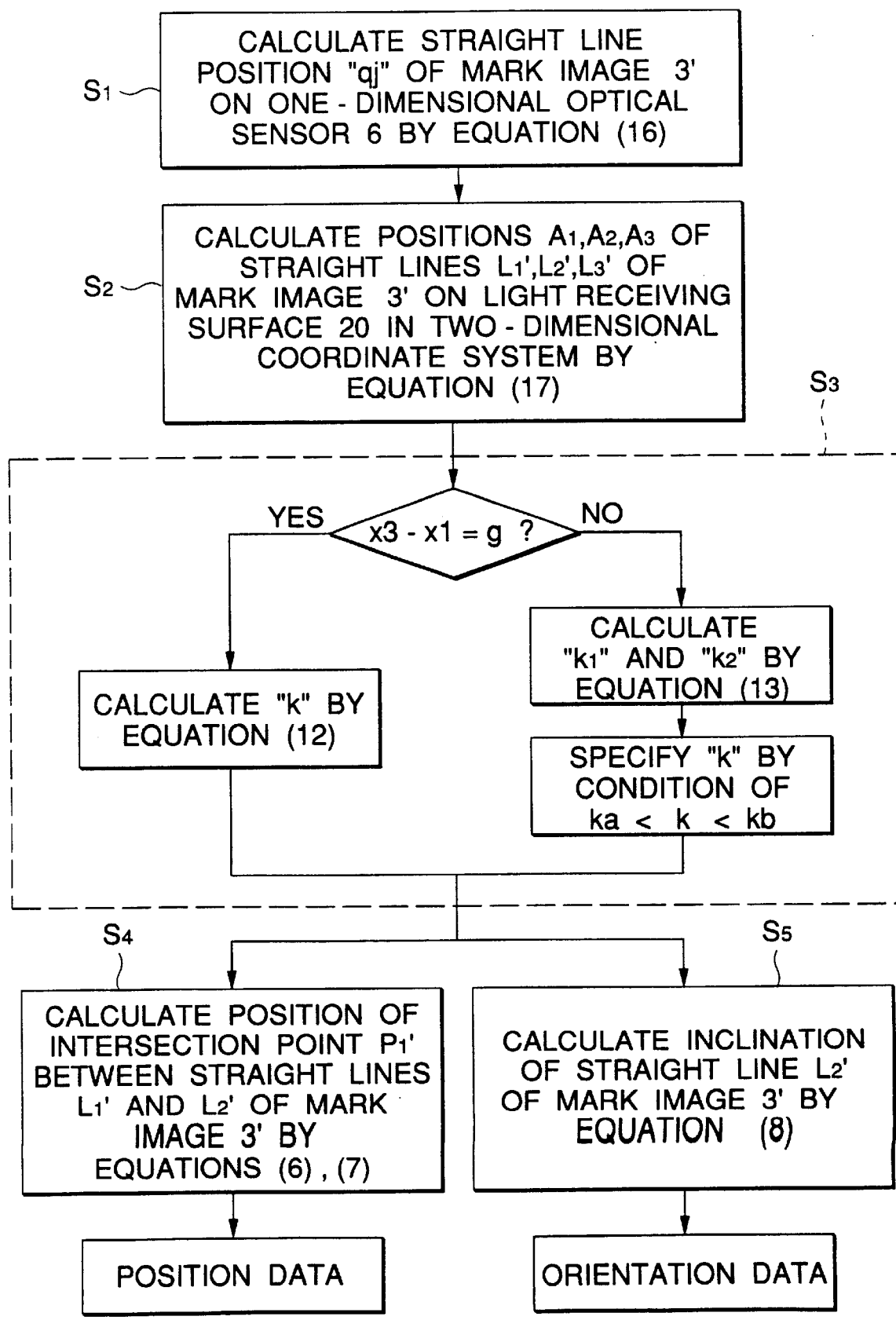
FIG. 19 is a flow chart for showing a calculation sequence executed in the two-dimensional position/orientation measuring apparatus according to the second embodiment of the present invention.

In FIG. 19, there is shown a flow chart for explaining the above-described calculation sequence. The two-dimensional position data can be obtained at steps $S_1, S_2, S_3, S_4$, whereas the two-dimensional orientation data can be obtained at steps $S_1, S_2, S_3, S_5$.

Also, the mark 3 constructed of the straight lines $L_1$ to $L_3$ of the openings may be made of a triangle as shown in FIG. 7C, and the contour lines of which may be employed as the straight lines for detection purposes. If the object 1 to be measured is made from a transparent material, such a mark made of a material whose transmittance is different from that of the transparent member may be printed out on this member, instead of the opening. For example, when the mark is written by black paint having low transmittance, the mark image 3' is detected as shown in FIG. 4, so that both the position and the orientation can be measured in a similar manner.

The mark 3 may be properly formed if the mark image 3' projected on a certain flat surface in the two-dimensional coordinate system owns the straight line portion detected by the one-dimensional optical sensor 6, $L_1, L_2, L_3$ need not be the straight lines. Accordingly, it is possible to measure the position and orientation of the measurement object other than the plate-like measurement object. In FIG. 17, the straight lines $L_1$, to $L_3$, of the mark image 3' may be detected by employing the independent one-dimensional optical sensor. At this time, the respective one-dimensional optical sensors may be arranged on separately provided flat surfaces having stepped portions.

As previously described, according to the two-dimensional position/orientation measuring mark of the present invention, the two points of intersection can be provided by the three line segments from the first line segment to the third line segment, whereas the distance between the two intersection points, and two angles defined between the first and second line segments, and the second and third line segments are merely known. As a result, there is no limitation in the mark forming method, and the mark can be simply formed. Also, in accordance with the two-dimensional position/orientation measuring apparatus and method of the present invention, since the one-dimensional optical sensor is merely utilized, the arrangement thereof can be made simple and in low cost. Also, since the point light source such as the small bulb is no longer required as the brightness point, the object under measurement can be readily handled. Moreover, according to the control apparatus for the image recording apparatus of the present invention, since the measuring precision does not depend on the speed of medium such as the paper sheet and the intermediate transfer belt, it is possible to obtain the measurement result in predetermined precision. Furthermore, according to the control apparatus for the manipulator of the present invention, since the object article is handled while the position and the orientation thereof are detected in real time, the information amount to be stored can be reduced. Also, the resultant software can be made simple.

What is claimed is:

1. A control apparatus for an image recording apparatus for forming a color image by overlapping toner images having different colors, comprising:

image signal producing means for producing an image signal of a mark which comprises two points of intersection between a first and a second line segment, and line segment said second and a third line, wherein an angle defined by said first and said second line segments, an angle defined by said second and said third line segments, and a distance between said two points of intersection are known;

a first image forming means for inputting therein said mark image signal to form a toner image of said mark in a first color at a first position of an image carrier;

a second image forming means for inputting therein said mark image signal to form a toner image of said mark in a second color at a second position adjacent to said first position of said image carrier;

at least one one-dimensional optical sensor for reading out first, second, and third line segment images contained in the toner images in said first and said second colors to thereby output readout signals;

a first calculating means for calculating positions of said first, said second, and said third line segment images contained in said toner images on said at least one one-dimensional optical sensor based upon said readout signals;

a second calculating means for calculating one position of said two intersection points contained in the toner image of said mark, and an inclination of one line segment among said first to third line segments, based upon the position of said at least one one-dimensional optical sensor with respect to each of said first and said second colors; and a third calculating means for calculating an error in registration of said second color toner image with respect to said first color toner image based on a calculation result of said second calculating means.

2. The control apparatus of claim 1, further comprising control means for outputting a control signal used to correct registration error based on the error calculated by said third calculating means.

3. The control apparatus for an image recording apparatus of claim 2, wherein said first and said second image forming means form a plurality of said marks at a preselected pitch along a process direction on said image carrier;

said first and said second calculating means perform a plurality of calculations for every one of said plurality of marks; and said third calculating means calculates said error based upon an average value of the results obtained from said plurality of calculations.

* * * * *